(12) United States Patent
Kamizono et al.

(10) Patent No.: US 7,575,085 B2
(45) Date of Patent: Aug. 18, 2009

(54) CAPACITANCE-BASED SENSOR AND OCCUPANT SENSING SYSTEM

(75) Inventors: Tsutomu Kamizono, Nagoya (JP); Shingo Wanami, Kariya (JP); Shinji Ando, Nukata-gun (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 489 days.

(21) Appl. No.: 11/337,896

(22) Filed: Jan. 23, 2006

(65) Prior Publication Data
US 2006/0164254 A1 Jul. 27, 2006

(30) Foreign Application Priority Data

| Jan. 24, 2005 | (JP) | ............................. 2005-015749 |
| Feb. 17, 2005 | (JP) | ............................. 2005-040773 |
| Mar. 7, 2005 | (JP) | ............................. 2005-062738 |

(51) Int. Cl.
*B60K 28/004* (2006.01)
(52) U.S. Cl. .................. 180/273; 280/735; 340/562
(58) Field of Classification Search .......... 180/273; 280/735; 340/562
See application file for complete search history.

(56) References Cited

U.S. PATENT DOCUMENTS

| 3,749,866 | A | * | 7/1973 | Tiazkun et al. ............. 200/85 A |
| 5,166,679 | A | * | 11/1992 | Vranish et al. .......... 340/870.37 |
| 5,446,391 | A | * | 8/1995 | Aoki et al. .................. 324/661 |
| 5,467,022 | A | | 11/1995 | Aoki et al. |
| 5,624,132 | A | * | 4/1997 | Blackburn et al. .......... 280/735 |
| 5,878,620 | A | * | 3/1999 | Gilbert et al. ................. 73/172 |
| 6,020,812 | A | * | 2/2000 | Thompson et al. .......... 340/438 |
| 6,043,743 | A | | 3/2000 | Saito et al. |
| 6,104,100 | A | * | 8/2000 | Neuman .................... 307/10.1 |
| 6,283,504 | B1 | | 9/2001 | Stanley et al. |
| 6,329,913 | B1 | | 12/2001 | Shieh et al. |
| 6,329,914 | B1 | | 12/2001 | Shieh et al. |
| 6,348,862 | B1 | | 2/2002 | McDonnell et al. |
| 6,356,194 | B1 | | 3/2002 | Fukui et al. |
| 6,366,200 | B1 | * | 4/2002 | Aoki ......................... 340/438 |

(Continued)

FOREIGN PATENT DOCUMENTS

DE 41 10 702 10/1992

(Continued)

OTHER PUBLICATIONS

Office Action dated Jun. 27, 2007 in German Application No. 10 2006 002 919.4-52 with English translation.
Office Action dated Oct. 19, 2007 in Chinese Application No. 2006 10006277.0 with English translation.
Office Action dated Feb. 3, 2009 from the Japan Patent Office in the corresponding patent application No. 2005-062738.

*Primary Examiner*—Paul N. Dickson
*Assistant Examiner*—Timothy Wilhelm
(74) *Attorney, Agent, or Firm*—Harness, Dickey & Pierce, PLC

(57) ABSTRACT

An occupant sensing electrode is embedded in a seat. An empty seat capacitance reducing electrode is placed between the occupant sensing electrode and a seat frame of the seat in an opposed relationship to the occupant sensing electrode. A dielectric base film may be interposed between the occupant sensing electrode and the empty seat capacitance reducing electrode. The occupant sensing electrode may include a plurality of electrode portions. The electrode portions may include high potential electrode portions and low potential electrode portions.

21 Claims, 16 Drawing Sheets

U.S. PATENT DOCUMENTS

| | | | |
|---|---|---|---|
| 6,378,900 B1 | 4/2002 | Stanley et al. | |
| 6,392,542 B1 | 5/2002 | Stanley | |
| 6,437,695 B1 * | 8/2002 | Eisenmann et al. | 340/562 |
| 6,445,294 B1 | 9/2002 | McDonnell et al. | |
| 6,490,515 B1 * | 12/2002 | Okamura et al. | 701/49 |
| 6,517,106 B1 | 2/2003 | Stanley et al. | |
| 6,520,535 B1 | 2/2003 | Stanley | |
| 6,563,231 B1 | 5/2003 | Stanley et al. | |
| 6,577,023 B1 | 6/2003 | Stanley et al. | |
| 6,598,900 B2 * | 7/2003 | Stanley et al. | 280/735 |
| 6,646,452 B2 * | 11/2003 | Lester | 324/661 |
| 6,696,948 B2 * | 2/2004 | Thompson et al. | 340/561 |
| 6,816,077 B1 * | 11/2004 | Shieh et al. | 340/602 |
| 6,825,765 B2 | 11/2004 | Stanley et al. | |
| 6,960,841 B2 * | 11/2005 | Saitou et al. | 307/10.1 |
| 7,098,674 B2 * | 8/2006 | Stanley et al. | 324/662 |
| 2001/0045733 A1 * | 11/2001 | Stanley et al. | 280/735 |
| 2005/0128082 A1 | 6/2005 | Stanley et al. | |

FOREIGN PATENT DOCUMENTS

| | | |
|---|---|---|
| DE | 41 10 936 | 10/1992 |
| DE | 195 47 842 | 6/1997 |
| DE | 197 24 168 | 8/1998 |
| DE | 198 26 391 | 12/1999 |
| JP | 5-188154 A | 7/1993 |
| JP | 7-270451 A | 10/1995 |
| JP | 11-268607 | 10/1999 |
| JP | 11-271463 | 10/1999 |

* cited by examiner

CAPACITANCE-BASED SENSOR AND OCCUPANT SENSING SYSTEM

CROSS REFERENCE TO RELATED APPLICATION

This application is based on and incorporates herein by reference Japanese Patent Application No. 2005-15749 filed on Jan. 24, 2005, Japanese Patent Application No. 2005-40773 filed on Feb. 17, 2005 and Japanese Patent Application No. 2005-62738 filed on Mar. 7, 2005.

BACKGROUND OF THE INVENTION

1. Field of the Invention

The present invention relates to a capacitance-based sensor, which is embedded in a vehicle seat, and also relates to an occupant sensing system, which determines an occupant state of the seat based on an output of the capacitance-based sensor.

2. Description of Related Art

One type of occupant sensing system includes a capacitance-based sensor and an occupant sensing electronic control unit (ECU). The capacitance-based sensor senses a disturbance in a weak electric field generated by an electrode and outputs the sensed result as the corresponding electric current or electric voltage (see, for example, Japanese Unexamined Patent Publication No. H11-271463).

Specifically, in a state of an empty seat where no occupant is present in the seat, the air is interposed between two electrodes of the capacitance-based sensor. In another state where a child restraint system (CRS) is installed in the seat, the CRS is interposed between the two electrodes of the capacitance-based sensor. In yet another state where an occupant is present in the seat, a body of the occupant is interposed between the two electrodes of the capacitance-based sensor.

Here, a dielectric constant of the air is about 1. A dielectric constant of the CRS is about 2 to 5 although it may vary depending on a material of the CRS. Furthermore, a dielectric constant of the human body is about 50. As illustrated above, the dielectric constant of the air, the dielectric constant of the CRS and the dielectric constant of the human body differ from one another. Thus, a capacitance between the two electrodes of the capacitance-based sensor varies depending on the type of the interposed object, which is interposed between the two electrodes.

Based on the differences in the capacitance, the occupant sensing ECU performs the occupant determination. Specifically, the occupant sensing ECU determines whether the seat is empty, whether the CRS is installed in the seat and/or whether an adult is present in the seat. An air bag ECU determines enablement/disablement of deployment of an air bag based on the result of the determination of the occupant sensing ECU. Specifically, in the state of the empty seat or in the state of the CRS installed in the seat, the deployment of the air bag is disabled. On the other hand, in the state where the adult is present in the seat, the deployment of the air bag is enabled.

The capacitance, which is measured with the capacitance-based sensor in the state where the occupant is present in the seat, includes the capacitance, which is generated upon seating of the occupant in the seat, and the capacitance, which has been present since the empty state of the seat. This point will be described with reference to FIG. 34. FIG. 34 is a diagram schematically showing a circuit structure of a previously proposed capacitance-based sensor. In FIG. 34, "Cb" is a capacitance between an electrode 120 and a vehicle ground, i.e., GND (or a seat frame that is grounded to the vehicle ground) through a human body, and "Co" is a capacitance (an empty seat capacitance), which has been present between the electrode 120 and the vehicle GND since the empty state of the seat. An electric current sensing device (an electric current sensing circuit) 131 measures the capacitance as a sum of the capacitance Cb and the capacitance Co. The capacitance (the empty seat capacitance) Co between the occupant sensing electrode 120 and the vehicle GND constitutes a relatively large ratio in the entire capacitance (the sum of the capacitance Cb and the capacitance Co), and variations in the empty seat capacitance Co directly causes variations in the entire capacitance to deteriorate the level of the accuracy in the occupant determination. Furthermore, the adjustment of the variation in the measured capacitance of the capacitance-based sensor in each vehicle causes a large increase in the factory work load.

Furthermore, with reference to FIG. 35, in the case of the occupant sensing system recited in Japanese Unexamined Patent Publication No. H11-271463, an occupant sensor 514 is provided on a top surface of a seat bottom 510 of a passenger seat. The occupant sensor 514 includes a first electrode 512 and a second electrode 513. An electric field is created between the first electrode 512 and the second electrode 513. When an occupant is seated on the seat bottom 510, a capacitance between the first electrode 512 and the second electrode 513 changes to cause a change in the electric current between the first electrode 512 and the second electrode 513. By measuring the change in this electric current, presence of the occupant on the seat bottom 510 is sensed.

However, there is provided only the single set of electrodes 512, 513. Thus, it is not possible to cover various seating patterns of the occupant. For example, when the occupant is displaced from the single set of electrodes 512, 513, the presence of the occupant on the seat bottom 510 cannot be effectively sensed.

SUMMARY OF THE INVENTION

The capacitance-based sensor and the occupant sensing system of the present invention are made in view of the above disadvantages. Thus, it is an objective of the present invention to provide a capacitance-based sensor and an occupant sensing system, which can improve a level of accuracy in occupant determination of a seat.

To achieve the objective of the present invention, there is provided a capacitance-based sensor that is arranged in a seat of a vehicle and senses presence of an occupant in the seat. The capacitance-based sensor includes an occupant sensing electrode, an empty seat capacitance reducing electrode, an electric current sensing device and a drive device. The occupant sensing electrode is embedded in the seat. The empty seat capacitance reducing electrode is opposed to the occupant sensing electrode and is positioned between the occupant sensing electrode and a seat frame of the seat, which is electrically connected to a vehicle ground. The electric current sensing device measures an electric current and is placed in one of a first position and a second position. The occupant sensing electrode is present on one side of the first position, and the empty seat capacitance reducing electrode is located on the other side of the first position, so that the first position is interposed and electrically connected between the occupant sensing electrode and the empty seat capacitance reducing electrode. The vehicle ground is located on one side of the second position, and the empty seat capacitance reducing electrode and the first position are located on the other side of the second position, so that the second position is interposed and electrically connected between the vehicle ground and the empty seat capacitance reducing electrode and the first position. The drive device generates a drive voltage and is positioned in the other one of the first and second positions.

To achieve the objective of the present invention, there is further provided a capacitance-based sensor that is arranged in a seat of a vehicle and senses presence of an occupant in the seat. The capacitance-based sensor includes a dielectric layer embedded in the seat, an occupant sensing electrode, an empty seat capacitance reducing electrode, a drive device and an electric current sensing device. The occupant sensing electrode includes a first group of electrode portions and a second group of electrode portions, which are arranged on a first side of the dielectric layer. The empty seat capacitance reducing electrode is arranged on a second side of the dielectric layer in an opposed relationship to the occupant sensing electrode, so that the empty seat capacitance reducing electrode is interposed between the occupant sensing electrode and a seat frame of the seat. One of at least one of the electrode portions of the first group and at least one of the electrode portions of the second group is located on one side of the drive device, and the empty seat capacitance reducing electrode and the other one of the at least one of the electrode portions of the first group and the at least one of the electrode portions of the second group are located on the other side of the drive device, so that the drive device applies a voltage between the one of at least one of the electrode portions of the first group and at least one of the electrode portions of the second group and the empty seat capacitance reducing electrode and the other one of the at least one of the electrode portions of the first group and the at least one of the electrode portions of the second group. The electric current sensing device measures an electric current between the at least one of the electrode portions of the first group and the at least one of the electrode portions of the second group.

To achieve the objective of the present invention, there is also provided a capacitance-based sensor that is arranged in a seat of a vehicle and senses presence of an occupant in the seat. The capacitance-based sensor includes a dielectric layer embedded in the seat, an occupant sensing electrode, an auxiliary electrode, an empty seat capacitance reducing electrode, a drive device and an electric current sensing device. The occupant sensing electrode includes a first group of electrode portions and a second group of electrode portions, which are arranged on a first side of the dielectric layer. The electrode portions of the first group and the electrode portions of the second group are alternately arranged. The auxiliary electrode extends between each of the electrode portions of the first group and an adjacent one of the electrode portions of the second group without electrically contacting the electrode portions of the first group and the electrode portions of the second group on the first side of the dielectric layer. The empty seat capacitance reducing electrode is arranged on a second side of the dielectric layer in an opposed relationship to the occupant sensing electrode and the auxiliary electrode, so that the empty seat capacitance reducing electrode is interposed between the occupant sensing electrode and a seat frame of the seat. The drive device applies a voltage between the occupant sensing electrode and the auxiliary electrode. The electric current sensing device measures an electric current between the occupant sensing electrode and the auxiliary electrode.

To achieve the objective of the present invention there is also provided an occupant sensing system, which includes any one of the above capacitance-based sensors and an occupant sensing ECU that determines an occupant state of the seat based on an output of the capacitance-based sensor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

FIRST EMBODIMENT

Figure 1:
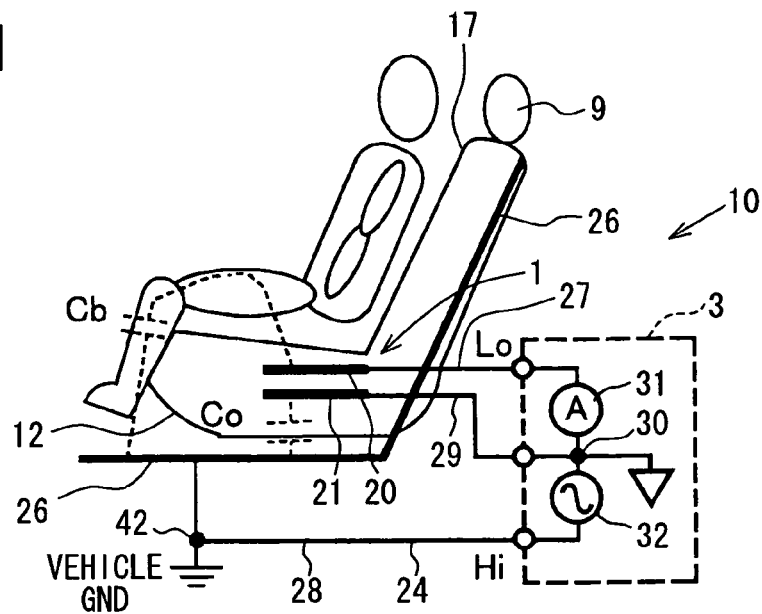
FIG. 1 is a diagram showing an overall structure of an occupant sensing system having a capacitance-based sensor according to a first embodiment of the present invention.
Figure 2:
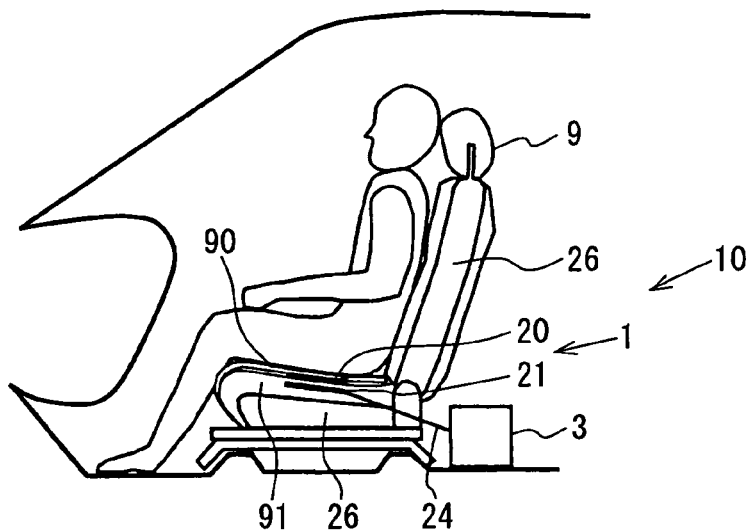
FIG. 2 is a diagram showing a front passenger seat to indicate an installation position of an electrode unit of the capacitance-based sensor.

FIG. 1 is a diagram showing an overall structure of an occupant sensing system having a capacitance-based sensor 10 according to a first embodiment. FIG. 2 is a diagram showing a front passenger seat 9 to indicate an installation position of an electrode unit 1, which serves as a sensing device of the capacitance-based sensor 10.

As shown in FIG. 1, the capacitance-based sensor 10 of the present embodiment includes an occupant sensing electrode 20, an empty seat capacitance reducing electrode 21, an electric current sensing device (an electric current sensing circuit) 31 and a drive device (a drive circuit) 32. The occupant sensing electrode 20 is embedded in at least one of a seat bottom 12 and a seatback 17 of the front passenger seat 9, which serves as a vehicle seat of the present invention. In this particular embodiment, as shown in FIG. 1, the occupant sensing electrode 20 is embedded in the seat bottom 12. The empty seat capacitance reducing electrode 21 is opposed to the occupant sensing electrode 20 and is arranged between the occupant sensing electrode 20 and a seat frame 26, which is electrically connected to a vehicle body, i.e., a vehicle ground (GND) 42 serving as a grounding electrode. The electric current sensing device 31 senses an electric current and is electrically connected between the occupant sensing electrode 20 and the empty seat capacitance reducing electrode 21 at a depicted position (a first position of the present invention). The drive device 32 is electrically connected between the vehicle GND 42 and the empty seat capacitance reducing electrode 21 and the electric current sensing device 31 at a depicted position (a second position of the present invention). Specifically, an electrically conductive line (a first conductive line) 27 extends from the occupant sensing electrode 20 to an intersecting point 30, and the electric current sensing device 31 is interposed between the occupant sensing electrode 20 and the intersecting point 30 in the conductive line 27. An electrically conductive line (a second conductive line) 28 extends from the vehicle GND 42 to the intersecting point 30, and the drive device 32 is interposed between the vehicle GND 42 and the intersecting point 30. Furthermore, an electrically conductive line (a third conductive line) 29 extends from the empty seat capacitance reducing electrode 21 to the intersecting point 30. The capacitance-based sensor 10 and an occupant sensing ECU 3 form the occupant sensing system of the present embodiment.

Here, as shown in FIG. 2, the passenger seat 9, in which the capacitance-based sensor 10 is installed, has the seat frame 26 made of metal, cushion members 91 and outer cover members (outer cover sheets or outer cover skins) 90. The metal seat frame 26 includes a seat bottom portion and a seatback portion. The seat bottom portion of the seat frame 26 is fixed to the vehicle body, and the seatback portion of the seat frame 26 is pivotably supported at a rear end of the seat bottom portion to allow pivotal movement of the seatback portion in a fore-and-aft direction of the vehicle. The cushion members 91 are provided to the seat bottom portion and the seatback portion, respectively, of the seat frame 26 and are made of, for example, foam resin. Each cover member 90 covers the corresponding cushion member 91. The seat frame 26 forms a skeletal structure of the front passenger seat 9. The electrode unit 1 is formed into a sheet shaped body, which includes the occupant sensing electrode 20 and the empty seat capacitance reducing electrode 21. The electrode unit 1 is interposed between the outer cover member 90 and the cushion member 91 of the seat bottom of the passenger seat 9.

The occupant sensing ECU 3 is arranged on a vehicle floor and is connected to the electrode unit 1 through a shielded line(s) 24. The occupant sensing ECU 3 includes the electric current sensing device 31, the drive device 32, an undepicted CPU and an undepicted communication interface (I/F). The electric current sensing device 31 constitutes a portion of the capacitance-based sensor 10. The CPU includes an analog-to-digital (A/D) converter. The CPU determines whether the passenger seat 9 is empty, whether a child restraint system (CRS) is installed in the passenger seat 9, and/or whether an adult is seated in the passenger seat 9 based on a value, which is obtained through A/D conversion of a measured capacitance that is measured by and outputted from the capacitance-based sensor 10. Then, the CPU outputs a result of the occupant determination to an undepicted air bag ECU through the communication I/F. Thereafter, the air bag ECU determines whether deployment of an air bag needs to be enabled or disabled based on the result of the occupant determination received from the occupant sensing ECU 3.

Figure 3:
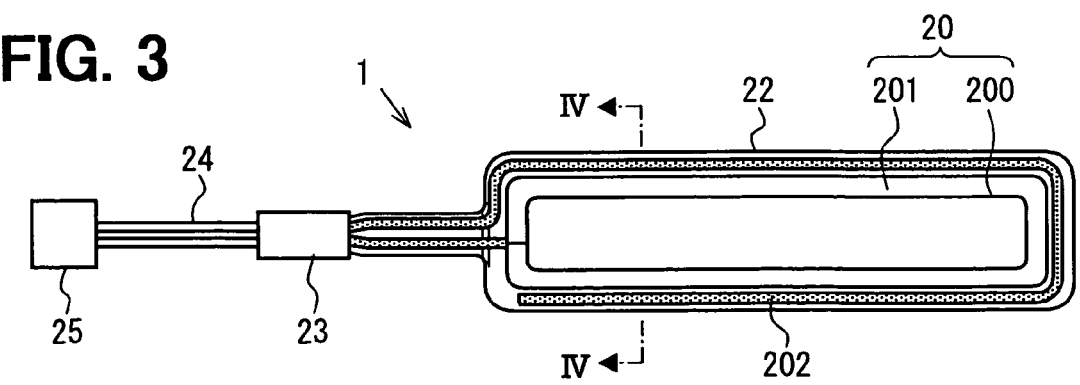
FIG. 3 is a schematic top view of the electrode unit.
Figure 4:
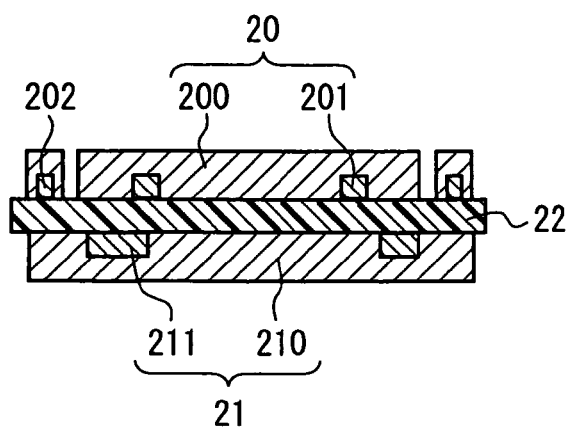
FIG. 4 is a cross sectional view along IV-IV in FIG. 3.

FIG. 3 is a schematic top view of the electrode unit 1, and FIG. 4 is a cross sectional view along line IV-IV in FIG. 3. As shown in FIGS. 3 and 4, the electrode unit 1 is formed as a unit member having the sheet shaped body and includes the occupant sensing electrode 20, the empty seat capacitance reducing electrode 21, a base film (a film member) 22, a shielded line connector 23, the shielded line 24 and an external connector 25.

In FIG. 4, vertical sizes of the base film 22, of the occupant sensing electrode 20 and of the empty seat capacitance reducing electrode 21 are not in scale and are exaggerated to provide better understanding. Furthermore, in FIG. 4, a silver electrode element of the occupant sensing electrode 20, a silver electrode element of the empty seat capacitance reducing electrode 21 and the base film 22 are shown in a simplified manner.

The base film 22 is a dielectric base member (a dielectric film, a dielectric sheet or a dielectric layer) having a top surface (a first surface located on a first side or upper side of the base film 22) provided with the occupant sensing electrode 20 and a bottom surface (a second surface that is opposite from the first surface and is located on a second side or lower side of the base film 22) provided with the empty seat capacitance reducing electrode 21. The base film 22 is formed into a rectangular sheet shaped body and is made of, for example, dielectric resin, such as polyethylene terephthalate (PET). A wet sensing electrode 202 is provided around the occupant sensing electrode 20 on the top surface of the base film 22 to sense application of water to the seat. In the present description, detailed description of the wet sensing electrode 202 is omitted.

The occupant sensing electrode 20 includes a carbon electrode element 200 and the silver electrode element 201. The occupant sensing electrode 20 is formed on the top surface of the base film 22 in such a manner that the occupant sensing electrode 20 is arranged generally in the center of the base film 22. The carbon electrode element 200 is shaped into a rectangular form. The silver electrode element 201 is formed into a rectangular frame form. The silver electrode element 201 is positioned slightly inward of an outer peripheral edge of the carbon electrode element 200.

The empty seat capacitance reducing electrode 21 includes a carbon electrode element 210 and the silver electrode element 211. The empty seat capacitance reducing electrode 21 is formed on the bottom surface of the base film 22 in such a manner that the empty seat capacitance reducing electrode 21 is opposed to the occupant sensing electrode 20. Thus, the occupant sensing electrode 20 and the empty seat capacitance reducing electrode 21 are electrically insulated from one another through the base film 22. The carbon electrode element 210 is shaped into a rectangular form. The silver electrode element 211 is formed into a rectangular frame form. The silver electrode element 211 is positioned slightly inward of an outer peripheral edge of the carbon electrode element 210.

The shielded line connector 23 and the external connector 25 are arranged on a rear side of the passenger seat 9. The occupant sensing electrode 20 and the empty seat capacitance reducing electrode 21 are connected to the shielded line connector 23 through a communication hole (not shown), which penetrates through the cushion member 91 of the passenger seat 9. The shielded line 24 connects between the shielded line connector 23 and the external connector 25. The external connector 25 is connected to the occupant sensing ECU 3.

Next, operation of each part of the occupant sensing system having the capacitance-based sensor 10 at the time of measuring the capacitance will be described with reference to FIG. 1. In the occupant-seated state of the passenger seat 9 (i.e., the state where the occupant is seated, i.e., present in the passenger seat 9), the body of the occupant is placed on the outer cover member 90. Thus, the human body is present in the path between the occupant sensing electrode 20 and the seat frame 26. When the drive device 32 generates a drive output of the high-frequency, low-voltage (drive voltage), the occupant sensing electrode 20 is driven to have a relatively low electric potential (hereinafter, simply referred to as a low electric potential). In this way, the capacitance Cb is generated between the occupant sensing electrode 20 and the vehicle GND 42 (the seat frame 26), which has a relatively high electric potential (hereinafter, simply referred to as a high electric potential), through the human body. At this time, the electric current, which flows between the vehicle GND 42 and the occupant sensing electrode 20, is measured through the electric current sensing device 31. Furthermore, the empty seat capacitance reducing electrode 21 is driven to have the same electric potential (the low electric potential) as that of the occupant sensing electrode 20. In this way, no capacitarice is generated between the occupant sensing electrode 20 and the empty seat capacitance reducing electrode 21, and the capacitance Co is generated between the empty seat capacitance reducing electrode 21 and the vehicle GND 42. That is, the capacitance Cb, which is generated through the human body in the state where the occupant is seated in the passenger seat, is effectively measured through the electric current sensing device 31. However, the capacitance Co, which has been present since the empty state of the passenger seat, is not measured through the electric current sensing device 31.

Therefore, according to the present embodiment, it is possible to reduce the variations (caused by, e.g., differences in the size and/or the material of the vehicle seat) in the measured capacitance, which is measured in the empty state of the passenger seat. Therefore, the CPU of the occupant sensing ECU 3 can make the occupant determination at a higher precision based on the measured capacitance of the capacitance-based sensor 10. Furthermore, when the occupant sensing systems of the present embodiment are installed in different types of vehicles, it is not required to perform an additional work such as adjustment of the measured capacitance (the measured capacitance of the empty seat) of the capacitance-based sensor 10 in the empty state of the passenger seat.

Furthermore, the portion of the conductive line 27, which electrically connects between the occupant sensing electrode 20 and the electric current sensing device 31, is formed by the shielded line 24, and the portion of the conductive line 28, which electrically connects between the vehicle GND 42 and the drive device 32, is formed by the shielded line 24. Thus, it is possible to reduce the influences of the noise.

Also, the occupant sensing electrode 20 is arranged on the one surface (the top surface) of the base film 22, which is the dielectric body, and the empty seat capacitance reducing electrode 21 is arranged on the other surface (the bottom surface) of the base film 22, so that the sheet form arrangement is made. In this way, it is easy to form the structure, in which the occupant sensing electrode 20 and the empty seat capacitance reducing electrode 21 are opposed to one another through the dielectric body. Also, it is easy to install the occupant sensing electrode 20 and the empty seat capacitance reducing electrode 21 in the vehicle seat.

SECOND EMBODIMENT

Figure 5:
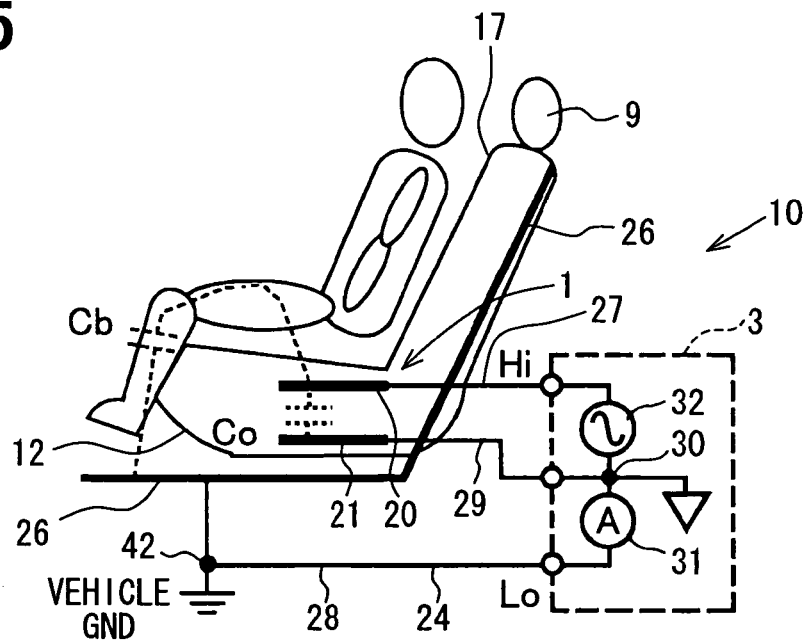
FIG. 5 is a diagram showing an overall structure of an occupant sensing system having a capacitance-based sensor according to a second embodiment.

As shown in FIG. 5, a second embodiment is characterized in that the drive device 32 is electrically connected between the occupant sensing electrode 20 and the empty seat capacitance reducing electrode 21 at the depicted position (the first position of the present invention), and the electric current sensing device 31 is electrically connected between the vehicle GND 42 and the empty seat capacitance reducing electrode 21 and the drive device 32 at the depicted position (the second position of the present invention).

Operation of each part of the capacitance-based sensor 10 at the time of measuring the capacitance will be described with reference to FIG. 5. When the drive device 32, which is connected between the occupant sensing electrode 20 and the empty seat capacitance reducing electrode 21, generates the drive output of the high-frequency, low-voltage, the occupant sensing electrode 20 is driven to have a high electric potential. In this way, the capacitance Cb is generated between the occupant sensing electrode 20 and the vehicle GND 42 (the seat frame 26), which has a low electric potential, through the human body. At this time, the electric current, which flows between occupant sensing electrode 20 and the vehicle GND 42 through the drive device 32, is measured through the electric current sensing device 31. The empty seat capacitance reducing electrode 21 has the same electric potential (the low electric potential) as that of the vehicle GND 42. Thus, no capacitance is generated between the empty seat capacitance reducing electrode 21 and the vehicle GND 42. Furthermore, the capacitance Co is generated between the occupant sensing electrode 20 and the empty seat capacitance reducing electrode 21. However, the electric current, which is generated due to the capacitance Co, does not flow through the electric current sensing device 31 and therefore is not sensed with the electric current sensing device 31. That is, the capacitance, which is generated through the human body in the state where the occupant is seated in the passenger seat, is effectively measured through the electric current sensing device 31. However, the capacitance (the empty seat capacitance), which has been present since the empty state of the passenger seat, is not measured through the electric current sensing device 31.

Thus, similar to the first embodiment, according to the present embodiment, it is possible to reduce the variations (caused by, e.g., differences in the size and/or the material of the vehicle seat) in the measured capacitance, which is measured in the empty state of the passenger seat.

THIRD EMBODIMENT

Figure 6:
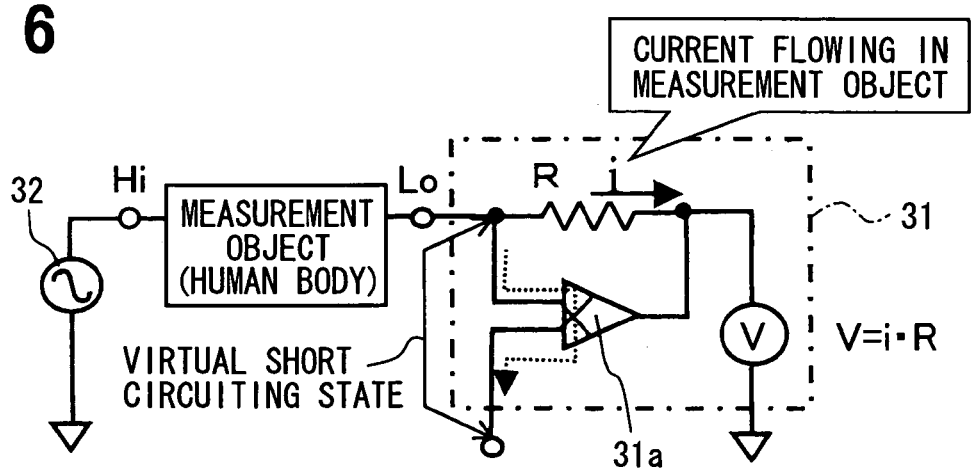
FIG. 6 is a diagram showing an overall structure of an occupant sensing system having a capacitance-based sensor according to a third embodiment.

A third embodiment is characterized in that the structure of the first or second embodiment is modified as follows. That is, as shown in FIG. 6, the electric current sensing device 31 has an operational amplifier 31a, which keep the same electric potential and electric insulation between the corresponding two electrodes, between which the electric current sensing device 31 is interposed. In this way, in the structure (the first embodiment) where the electric current sensing device 31 is connected between the occupant sensing electrode 20 and the empty seat capacitance reducing electrode 21, these electrodes 20, 21 can be made in the state (the virtual short-circuiting state) where the same electric potential and the electric insulation are effectively provided between the electrodes 20, 21 by the operational amplifier 31a. In this state, a voltage drop V caused by a resistance R is measured with a voltmeter. Based on the relationship of V=i·R, the electric current i, which flows through the human body (the measurement subject), can be sensed at the higher precision with the simple structure. In the case of the second embodiment, the corresponding two electrodes, between which the electric current sensing device 31 is placed, are the empty seat capacitance reducing electrode 21 and the vehicle GND 42, so that the same electric potential and the electric insulation are effectively provided between the electrode 21 and the vehicle GND 42 by the operational amplifier 31a.

FOURTH EMBODIMENT

A fourth embodiment is characterized in that the structure of the first or second embodiment is modified as follows. That is, at least a portion of the conductive line (the first conductive line), which electrically connects between the occupant sensing electrode and the corresponding one of the electric current sensing device and the drive device is formed by the shielded line, and at least a portion of the conductive line (the second conductive line), which electrically connects between the vehicle ground and the other one of the electric current sensing device and the drive device, is formed by the shielded line. Here, a shield portion (a shield that surrounds the conductive line) of the shielded line is made to have the same electric potential as that of the empty seat capacitance reducing electrode. Here, the same single shielded line is used to form the portions of the first and second conductive lines. Alternatively, two separate shielded lines may be provided to form the portions of the first and second conductive lines, respectively, and the shield portions of these separate shielded lines may be electrically connected to the empty seat capacitance reducing electrode.

Figure 7:
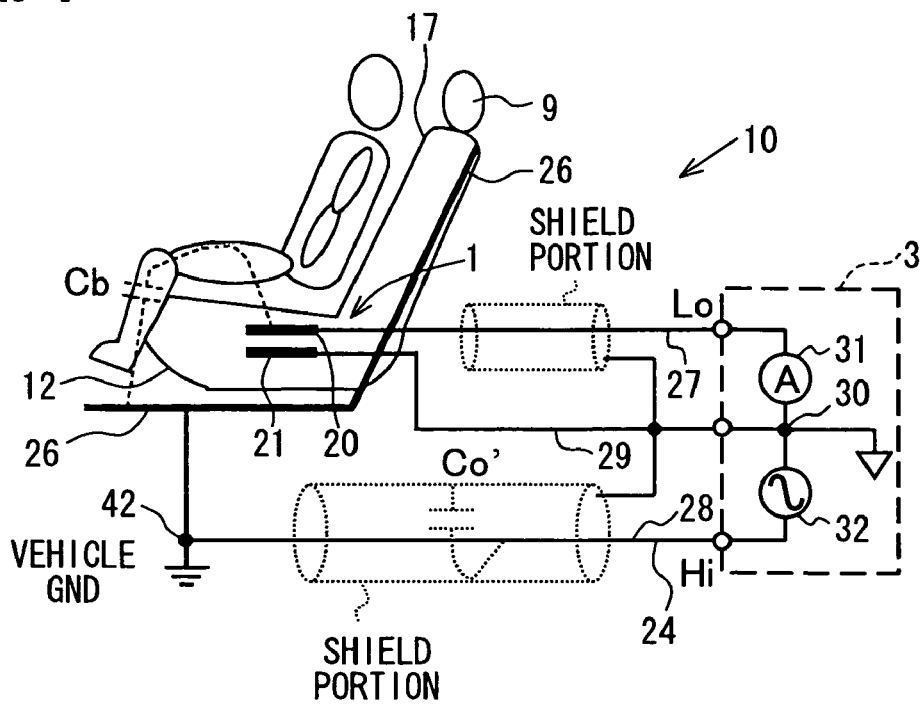
FIG. 7 is a diagram showing an overall structure of an occupant sensing system having a capacitance-based sensor according to a fourth embodiment, which is a modification of the first embodiment.
Figure 8:
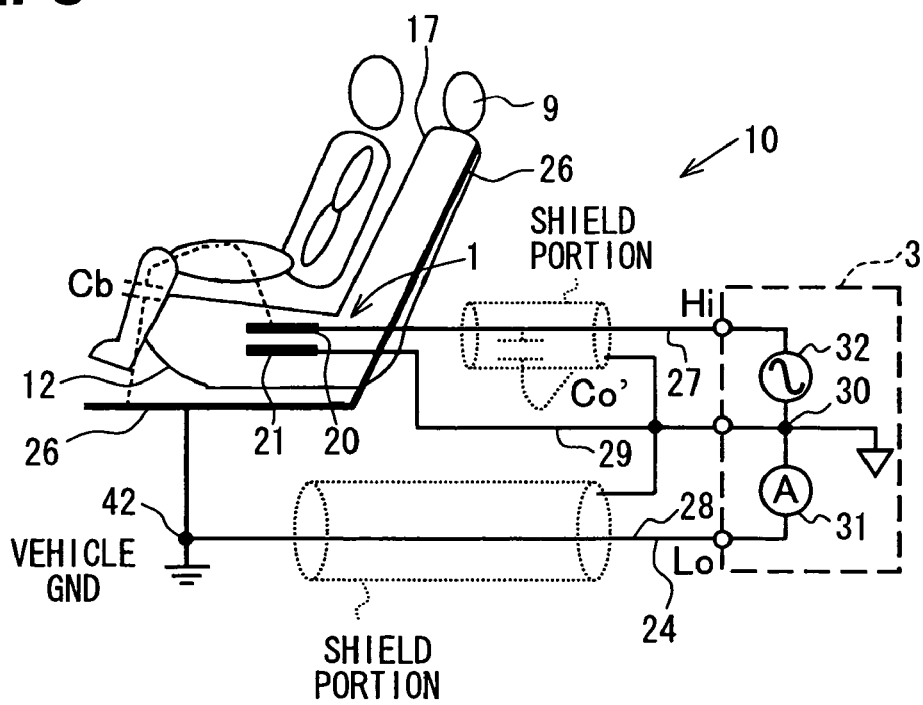
FIG. 8 is a diagram showing a modification of the capacitance-based sensor shown in FIG. 7.

Specifically, in the case of the first embodiment, as shown in FIG. 7, the portion of the conductive line (the first conductive line) 27, which electrically connects between the occupant sensing electrode 20 and the electric current sensing device 31, may be formed by the shielded line 24, and the portion of the conductive line (the second conductive line) 28, which electrically connects between the vehicle GND 42 and the drive device 32, may be formed by the shielded line 24. The shield portion of the shielded line 24 is connected to the empty seat capacitance reducing electrode 21 to have the same electric potential as that of the empty seat capacitance reducing electrode 21. In the case of the second embodiment, as shown in FIG. 8, the portion of the conductive line (the first conductive line) 27, which electrically connects between the occupant sensing electrode 20 and the drive device 32, may be formed by the shielded line 24, and the portion of the conductive line (the second conductive line) 28, which electrically connects between the vehicle GND 42 and the electric current sensing device 31, may be formed by the shielded line 24. The shield portion of the shielded line 24 is connected to the empty seat capacitance reducing electrode 21 to have the same electric potential as that of the empty seat capacitance reducing electrode 21. With the above structure, at least the portion of the respective conductive line 27, 28 is formed by the shielded line 24, so that the influences of the noise can be reduced. Furthermore, the shield portion of the shielded line 24 is made to have the same electrical potential as that of the empty seat capacitance reducing electrode 21. Thus, a capacitance Co' between the respective conductive line 27, 28 and the shield portion in the shielded line 24 is reduced. Therefore, it is possible to further reduce the variations in the measured empty seat capacitance.

FIFTH EMBODIMENT

Figure 9:
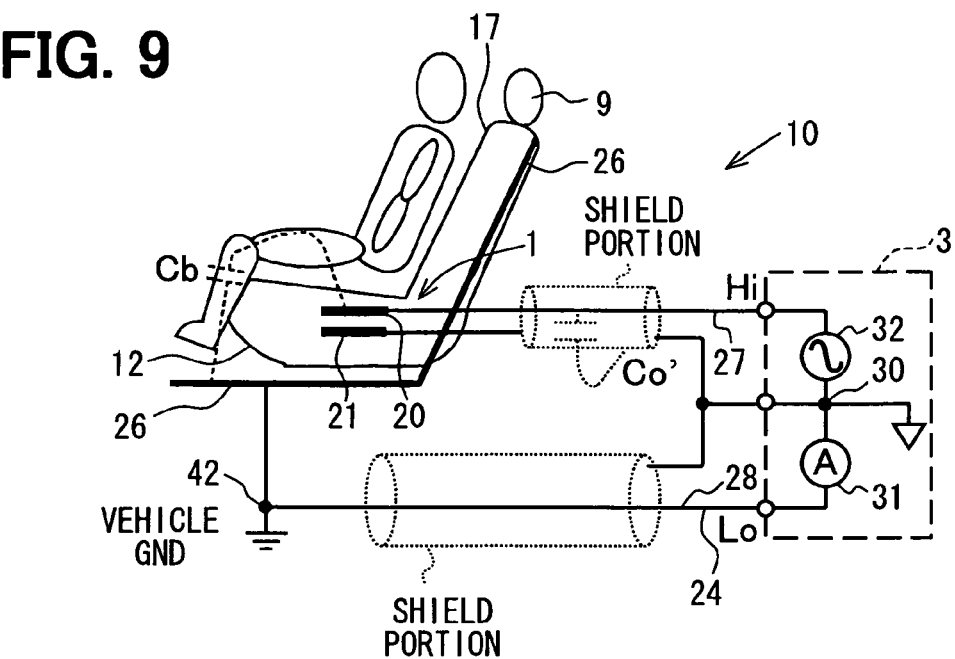
FIG. 9 is a diagram showing an overall structure of an occupant sensing system having a capacitance-based sensor according to a fifth embodiment.

A fifth embodiment is characterized in that the structure of the fourth embodiment is modified as follows. That is, as shown in FIG. 9, the empty seat capacitance reducing electrode 21 is electrically connected to the electric current sensing device 31 and the drive device 32 through the shield portion of the shielded line 24. With the structure of the present embodiment, it is not required to provide the separate conductive line, which connects the empty seat capacitance reducing electrode 21 to the electric current sensing device 31 and the drive device 32. Thus, the structure is simplified, and the costs can be reduced.

SIXTH EMBODIMENT

Figure 10:
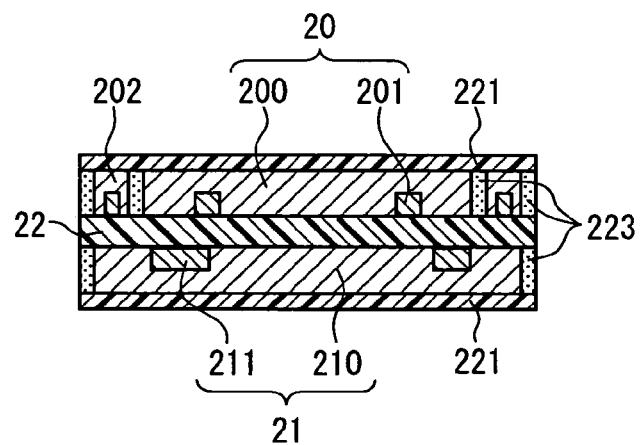
FIG. 10 is cross sectional view of an electrode unit according to a sixth embodiment.

A sixth embodiment is characterized in that the structure of the first or second embodiment is modified as follows. That is, as shown in FIG. 10, an outer surface of the occupant sensing electrode 20 is coated with a resin film (dielectric material) 221, and an outer surface of the empty seat capacitance reducing electrode 21 is coated with the resin film (the dielectric material) 221. In the above structure, the resin films 221 are bonded to the base film 22 through the dielectric adhesive 223. In this way, the surface of the occupant sensing electrode 20 and the surface of the empty seat capacitance reducing electrode 21 are coated with the dielectric material. With this structure, when water is applied to and is soaked into the passenger seat 9 (the vehicle seat), it is possible to limit contact of the water to the electrodes 20, 21 and thereby to limit damage of the electrodes 20, 21.

SEVENTH EMBODIMENT

Figure 11:
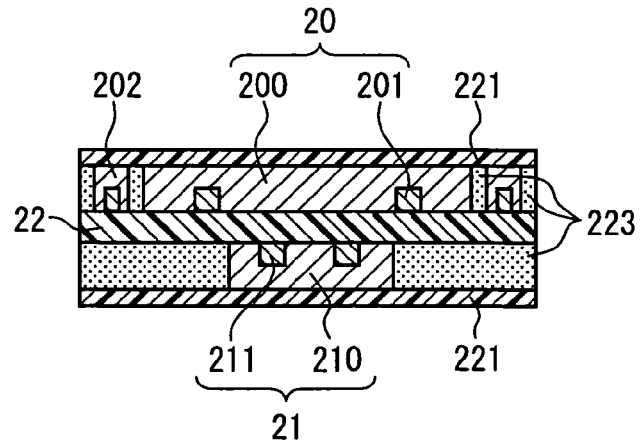
FIG. 11 is cross sectional view of an electrode unit according to a seventh embodiment.
Figure 12:
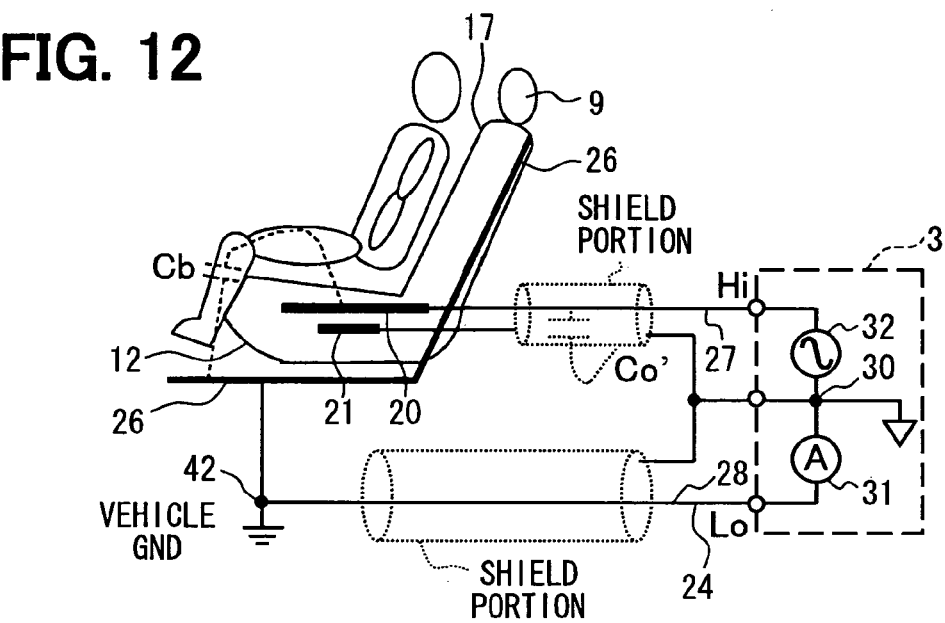
FIG. 12 is a diagram showing an overall structure of an occupant sensing system having a capacitance-based sensor according to the seventh embodiment.

A seventh embodiment is characterized in that the structure of the sixth embodiment is modified as follows. That is, as shown in FIG. 11, a surface area of the occupant sensing electrode 20 is made larger than a surface area of the empty seat capacitance reducing electrode 21. FIG. 12 is a diagram, which schematically shows the overall structure of the occupant sensing system having the capacitance-based sensor 10 according to the present embodiment. With the present embodiment, by making the surface area of the occupant sensing electrode 20 larger than the surface area of the empty seat capacitance reducing electrode 21, it is possible to increase a difference between the measured capacitance, which is measured in the empty state of the passenger seat, and the measured capacitance, which is measured in the occupant-seated state of the passenger seat. Thus, it is possible to increase a degree of accuracy in the occupant sensing. Furthermore, by increasing the degree of accuracy in the occupant sensing, it is possible to distinguish between the empty state of the passenger seat and the CRS-installed state of the passenger seat.

EIGHTH EMBODIMENT

Figure 13:
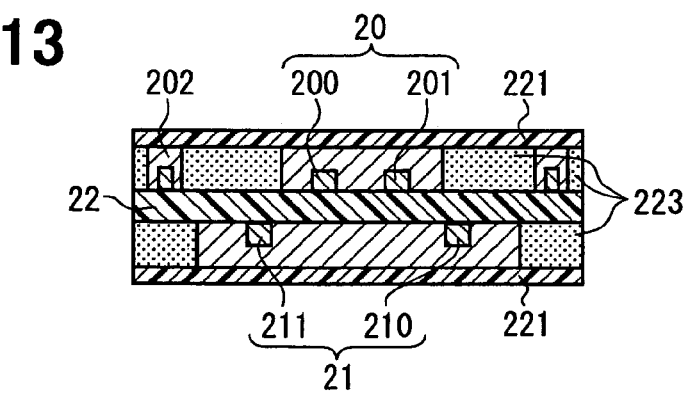
FIG. 13 is cross sectional view of an electrode unit according to an eighth embodiment.

An eighth embodiment is characterized in that the structure of the sixth embodiment is modified as follows. That is, as shown in FIG. 13, the surface area of the empty seat capacitance reducing electrode 21 is made larger than the surface area of the occupant sensing electrode 20. With the present embodiment, by making the surface area of the empty seat capacitance reducing electrode 21 larger than the surface area of the occupant sensing electrode 20, it is possible to reduce the capacitance Co between the occupant sensing electrode 20 and the seat frame 26. Therefore, it is possible to further reduce the variations in the measured empty seat capacitance.

The capacitance-based sensor and the occupant sensing system of the present invention have been described in view of the various embodiments. However, the present invention is not limited to the above embodiments. The above embodiments can be modified in various ways in view of knowledge of a person skilled in the art without departing from the scope and spirit of the invention.

For example, the structure of the first or second embodiment may be modified such that when the occupant sensing ECU 3 senses an unbuckled state of a seat belt based on an output of a belt buckle switch device, the occupant sensing ECU 3 may determine that the passenger seat is empty and has no CRS installed therein (an empty and CRS absent state of the passenger seat). With this arrangement, through use of the output from the belt buckle switch device, it is possible to distinguish the empty and CRS absent state of the passenger seat (i.e., the state in which both the occupant and the CRS are absent), which is sometimes difficult when relying only on the measured capacitance. Thus, for example, when the occupant and CRS absent state of the passenger seat is detected, an air bag OFF lamp, which is lit to indicate the air bag deployment disabled state, may be turned off. In this way, the annoyance, which is caused by the lighting of the unnecessary warning lamp, can be reduced.

Figure 14:
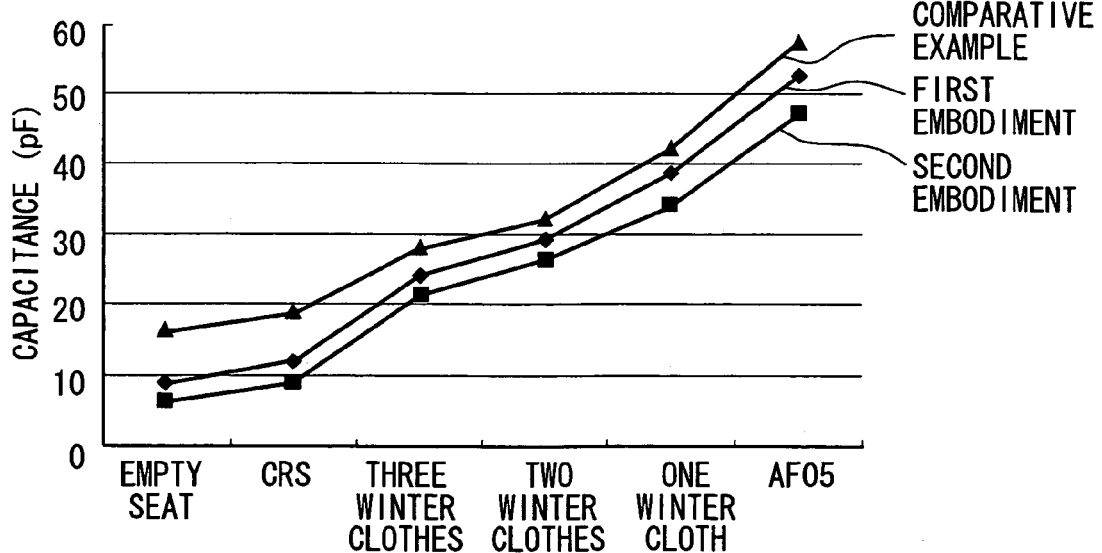
FIG. 14 is a graph, which shows a result of a first experiment.
Figure 34:
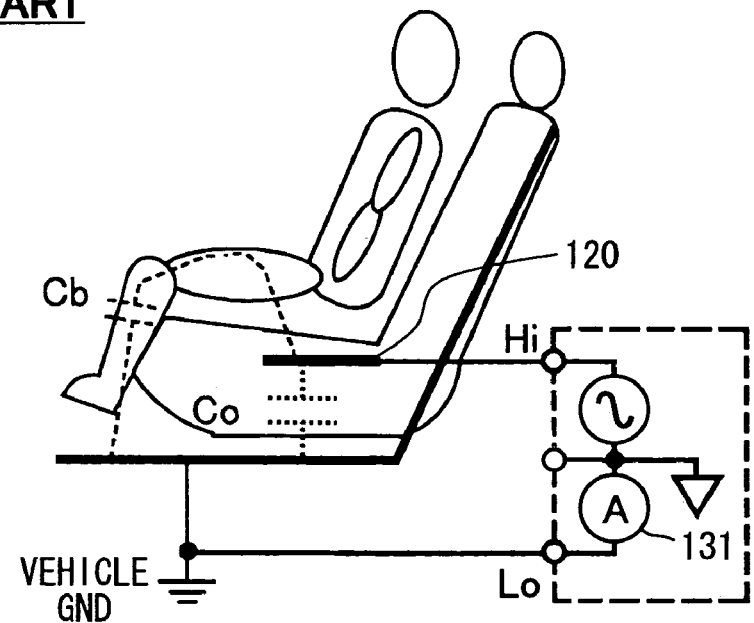
FIG. 34 is a diagram showing an overall structure of a previously proposed occupant sensing system having a capacitance-based sensor.
Figure 35:
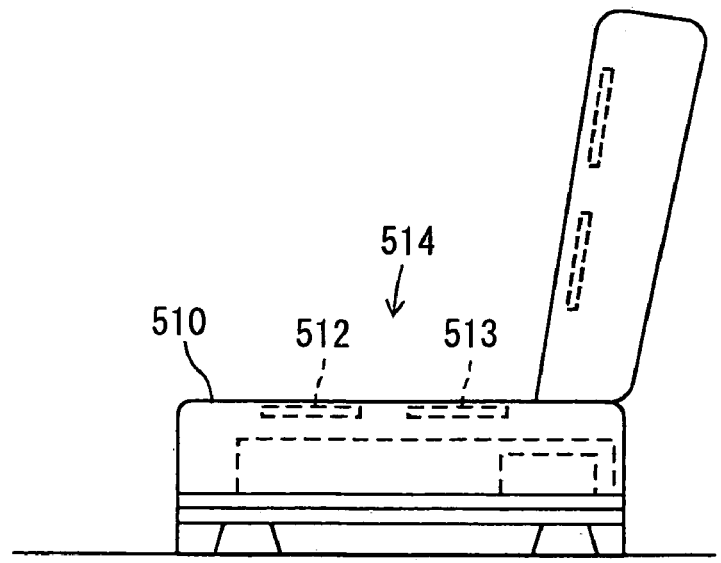
FIG. 35 is a diagram showing a prior art occupant sensing system.

Hereinafter, the result of experiments for testing the capacitance-based sensor 10 of each of the above embodiments will be described with reference to the accompanying drawings. The first experiment is performed to verify the reduction of the measured empty seat capacitance according to each of the first and second embodiments in comparison to the previously proposed structure. In the present experiment, the capacitance is measured under various measurement conditions for each of a comparative example, the first embodiment and the second embodiment. In the comparative example, the previously proposed capacitance-based sensor shown in FIG. 34 is used. The measurement conditions include a seat empty state, a CRS-installed state, a three-winter cloth wearing state (i.e., wearing three winter clothes), a two-winter cloth wearing state (i.e., wearing two winter clothes), a single-winter cloth wearing state (i.e., wearing a single winter cloth) and AF05 (AF05 body size, small American female). FIG. 14 is a graph, which shows the result of the first experiment. It is verified that the measured empty seat capacitance in both of the first and second embodiments is reduced to about one-half of that of the comparative example. Furthermore, for each of the other conditions, which are other than the seat empty state, it is verified that the measured capacitance in both of the first and second embodiments is reduced relative to the comparative example by the amount that corresponds to that of the empty state.

Figure 15:
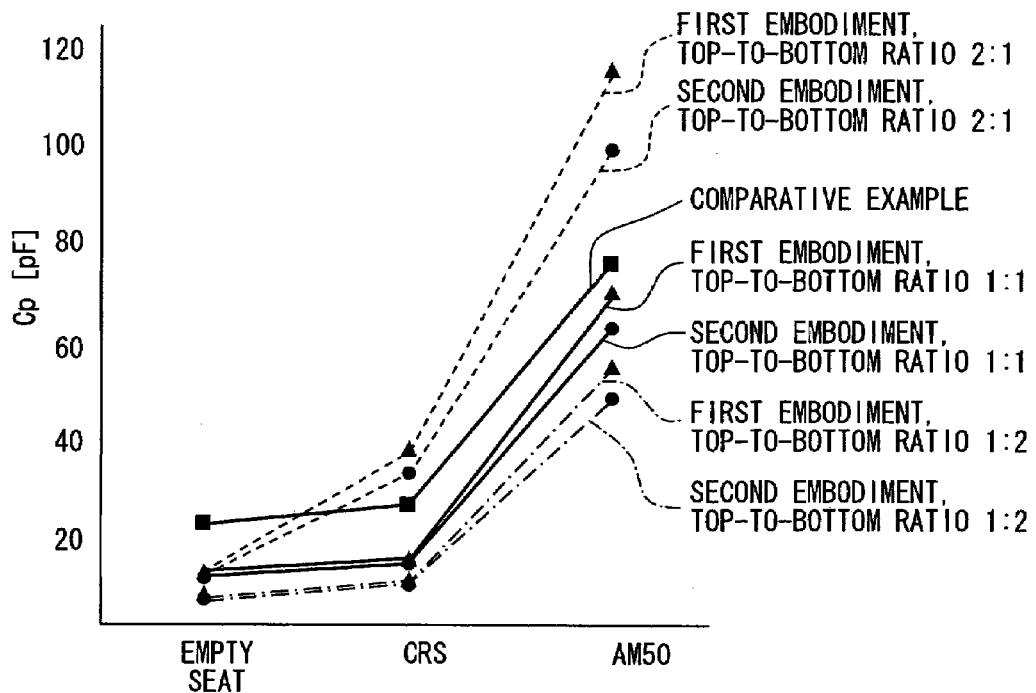
FIG. 15 is a graph, which shows a result of a second experiment.

In the second experiment, for each of the first and second embodiments, a surface ratio (hereinafter, referred to as a top-to-bottom electrode surface ratio or simply referred to as a top-to-bottom ratio) between the occupant sensing electrode 20 and the empty seat capacitance reducing electrode 21 is set to 1:1, 2:1 and 1:2. Under this setting, the capacitance is measured for each of the seat conditions. In the comparative example, similar to the first experiment, the capacitance-based sensor shown in FIG. 34 is used. The measurement conditions include a seat empty state, a CRS-installed state and AM50 (AM50 body size, standard American male). FIG. 15 is a graph showing a result of the second experiment. In the case of the top-to-bottom electrode surface ratio of 2:1, the measured capacitance differs significantly from one measurement condition to another measurement condition, and it is verified that the level of accuracy in the occupant determination is relatively high. In the case of the top-to-bottom electrode surface ratio of 1:2, the empty seat capacitance is minimum, and it is verified that the variations in the measured empty seat capacitance are further effectively reduced.

NINTH EMBODIMENT

A ninth embodiment will be described with reference to FIGS. 16 to 18. The present embodiment is substantially the same as that of the second embodiment shown in FIG. 5 except a line selecting switch device 60. The switch device 60 is provided to allow detection of malfunctioning (e.g., short circuit, line braking) of the capacitor between the occupant sensing electrode 20 and the empty seat capacitance reducing electrode 21. More specifically, in the second embodiment, the electric current, which is generated due to the presence of the capacitance Co between the occupant sensing electrode 20 and the empty seat capacitance reducing electrode 21, is not measured through the electric current sensing device 31. Thus, in some cases, at the time of the malfunctioning of the capacitor (or an electrical connection) between the occupant sensing electrode 20 and the empty seat capacitance reducing electrode 21, the malfunctioning of the capacitor may not be detected properly through the electric current sensing device 31. When the malfunctioning of the capacitor cannot be detected at the time of determining the occupant state of the seat, it may deteriorate the accuracy of the determined result of the occupant state of the seat. The ninth embodiment provides the additional measures in the form of the switch device 60 to addresses the above disadvantage and thereby to further improve the accuracy of the determined result of the occupant state of the seat. Thus, in the following description, the ninth embodiment will be focused on the structure and the operation of the switch device 60, and the rest of the structure other than the switch device 60 will not be described in detail.

The switch device 60 is provided to change a connecting state of the conductive lines 27-29. As shown in FIG. 18, the switch device 60 includes first to fourth terminals 61-64 and first and second switching elements 66-67. The first terminal 61 and the fourth terminal 64 are branched from the conductive line 29, and the second terminal 62 and the third terminal 63 are branched from the conductive line 28. The first switching element 66 and the second switching element 67 are switched concurrently.

Specifically, the drive device 32 is interposed between a first end and a second end of the conductive line (the first conductive line) 27. The first end of the conductive line 27 is directly connected to the occupant sensing electrode 20. The electric current sensing device 31 is interposed between a first end and a second end of the conductive line (the second conductive line) 28. The first end of the conductive line 28 is directly connected to the vehicle GND 42, and the second end of the conductive line 28 is connected to the second end of the conductive line 27 at the intersecting point 30. A first end of the conductive line (the third conductive line) 29 is directly connected to the empty seat capacitance reducing electrode 21, and a second end of the conductive line 29 is connected to the second end of the conductive line 27 and the second end of the conductive line 28 at the intersecting point 30. The switch device 60 executes switching for the conductive line 28 and the conductive line 29. More specifically, the switch device 60 divides the conductive line 28 into a first part 28a and a second part 28b. The first part 28a includes the first end of the conductive line 28, which is directly connected to the vehicle GND 42. The second terminal 62 and the third terminal 63 are branched from the first part 28a of the conductive line 28. The second part 28b includes the second end of the conductive line 28 and the electric current sensing device 31. Furthermore, the switch device 60 divides the conductive line 29 into a first part 29a and a second part 29b. The first part 29a includes the first end of the conductive line 29, which is directly connected to the empty seat capacitance reducing electrode 21. The first terminal 61 and the fourth terminal 64 are branched from the first part 29a of the conductive line 29. The second part 29b includes the second end of the conductive line 29, which is connected to the second end of the conductive line 27 and the second end of the conductive line 28 at the intersecting point 30.

Next, the operation of the present embodiment will be described.

First, an occupant state sensing operation of the present embodiment will be described.

Figure 18:
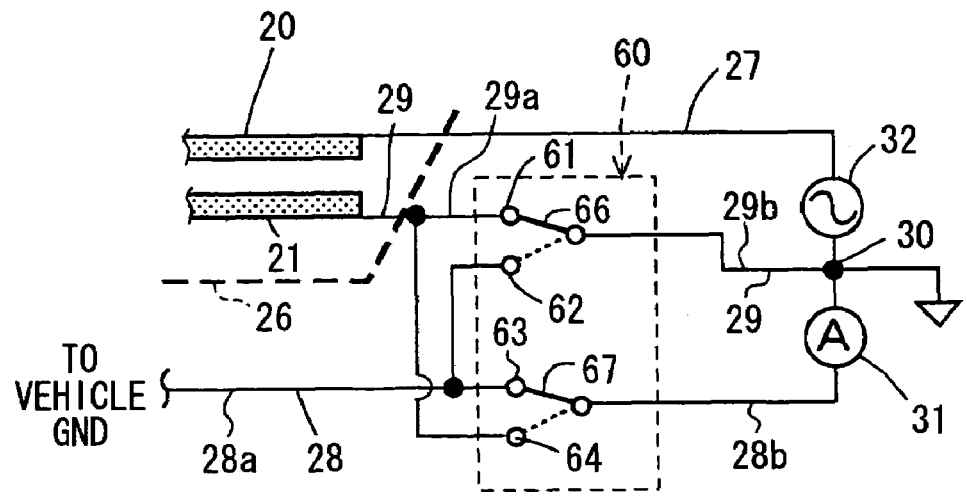
FIG. 18 is a partial diagram showing a circuit structure of a line selecting switch device of the capacitance-based sensor according to the ninth embodiment.

At the time of sensing the occupant state of the seat (the time of sensing the seating of the occupant), the switch device 60 of FIG. 18 is placed in a first position, so that the first and second switching elements 66, 67 are located in its corresponding position indicated by a solid line in FIG. 18. This first position of the switch device 60 is schematically shown in FIG. 16. In FIG. 16, the occupant sensing ECU 3 is not shown for the sake of simplification and clear understanding.

This arrangement is the same as that of the second embodiment shown in FIG. 5 except the presence of the switch device 60, as mentioned above. Specifically, in this state, the first switching element 66 is connected to the first terminal 61, and the second switching element 67 is connected to the third terminal 63. In other words, the switch device 60 electrically connects between the first part 28a of the conductive line 28 and the second part 28b of the conductive line 28 and also electrically connects between the first part 29a of the conductive line 29 and the second part 29b of the conductive line 29. When the occupant is seated in the seat 9, the lower half of the occupant body is placed on the outer cover member 90 (FIG. 2), and the occupant body is interposed between the occupant sensing electrode 20 and the seat frame 26. When the high-frequency, low-voltage (drive voltage) is generated from the drive device 32, the occupant sensing electrode 20 is driven to have the high electric potential, and the vehicle GND 42 and the empty seat capacitance reducing electrode 21 are driven to have the low electric potential. Thus, similar to the second embodiment, the capacitance Cb is generated between the occupant sensing electrode 20 and the vehicle GND 42 (the seat frame 26) through the human body, and the current, which flows between the vehicle GND 42 and the occupant sensing electrode 20 is measured with the electric current sensing device 31.

Since the empty seat capacitance reducing electrode 21 is driven by the drive device 32 to have the same electric potential (the low electric potential) as that of the vehicle GND 42, capacitance is not generated between the vehicle GND 42 and the empty seat capacitance reducing electrode 21. The capacitance Co is generated between the empty seat capacitance reducing electrode 21 and the occupant sensing electrode 20. However, this capacitance Co is not sensed with the electric current sensing device 31, as described with reference to FIG. 5 in the second embodiment.

Next, a malfunction sensing operation of the present embodiment will be described.

At the time of sensing the malfunctioning, the switch device 60 of FIG. 18 is placed in a second position, so that the first and second switching elements 66, 67 are located in its corresponding position indicated by a dotted line in FIG. 18. This second position of the switch device 60 is schematically shown in FIG. 17. Specifically, the first switching element 66 is connected to the second terminal 62, and the second switching element 67 is connected to the fourth terminal 64. The conductive line 27 is connected to the conductive line 28 at the intersecting point 30. Here, the drive device 32 is located between the occupant sensing electrode 20 and the vehicle GND 42, and the electric current sensing device 31 is located between the vehicle GND 42 and the empty seat capacitance reducing electrode 21. In other words, the switch device 60 electrically connects between the first part 29a of the conductive line 29 and the second part 28b of the conductive line 28, so that the occupant sensing electrode 20 is electrically connected to the empty seat capacitance reducing electrode 21 through the drive device 32 and the electric current sensing device 31.

The drive device 32 drives the occupant sensing electrode 20 to the high electric potential and the empty seat capacitance reducing electrode 21 to the low electric potential, and the capacitance between the occupant sensing electrode 20 and the empty seat capacitance reducing electrode 21 is measured with the electric current sensing device 31. With the above arrangement, when short circuiting occurs between the occupant sensing electrode 20 and the empty seat capacitance reducing electrode 21, erroneous sensing of the capacitance, i.e., erroneous sensing of the occupant state in the seat can be limited. Also, when braking (open circuiting) of the conductive line 27 and/or the conductive line 29 occurs, non-detection of the capacitance, i.e., the non-detection of the occupant state in the seat can be limited.

The sensor 10 of the present embodiment provides the following advantages. First, at the time of sensing the occupant state in the seat, the empty seat capacitance Co is reduced (eliminated), so that the occupant state in the seat can be correctly sensed based on the capacitance Cb, which is generated between the occupant sensing electrode 20 and the seat frame 26 through the human body. The electrode unit 1 (FIG. 3) is formed into the sheet shaped body, so that the occupant sensing electrode 20 and the empty seat capacitance reducing electrode 21 can be easily formed on the top surface and the bottom surface, respectively, of the base film 22.

Furthermore, the malfunction of non-detection of the electric current between the occupant sensing electrode 20 and the empty seat reducing electrode 21 at the time of presence of occupant can be sensed in advance in the empty state of the seat. In this way, the normal operation of the sensor 10 can be ensured. Furthermore, when the operational mode needs to be changed from the occupant state sensing operational mode to the malfunction sensing operational mode, it is only required to shift the switch from the first position to the second position.

Figure 16:
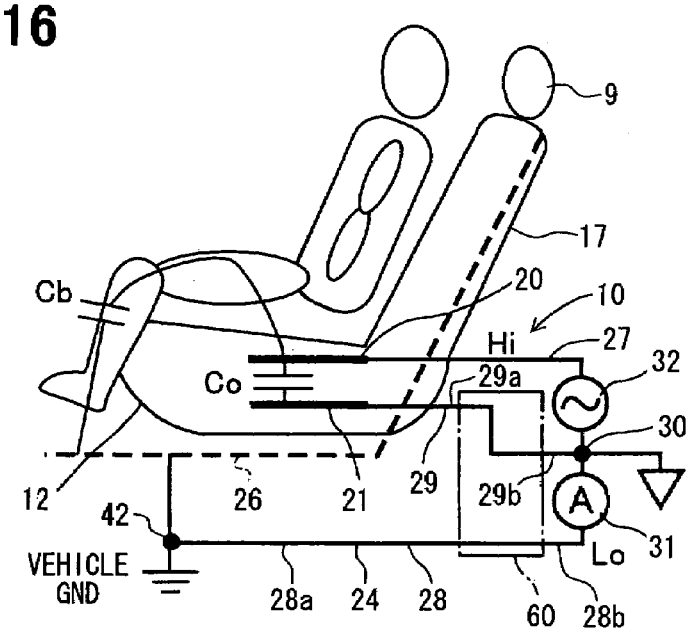
FIG. 16 is a diagram showing an overall structure of an occupant sensing system having a capacitance-based sensor in an occupant state sensing operational mode according to a ninth embodiment.
Figure 17:
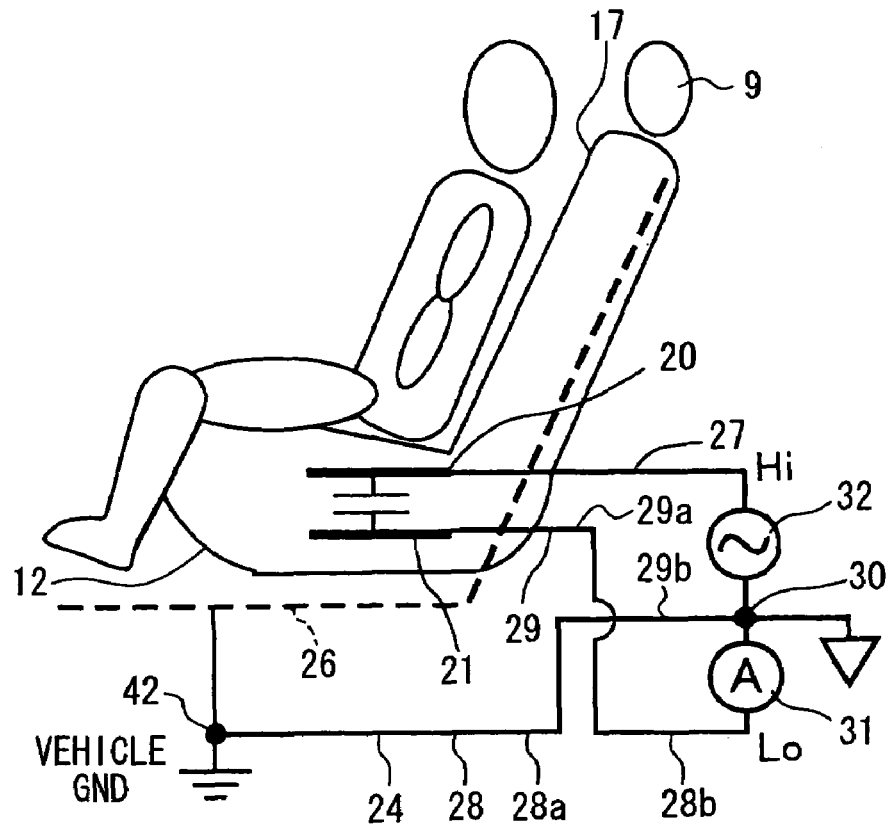
FIG. 17 is a diagram similar to that of FIG. 16 showing a malfunction sensing operational mode according to the ninth embodiment.
Figure 19:
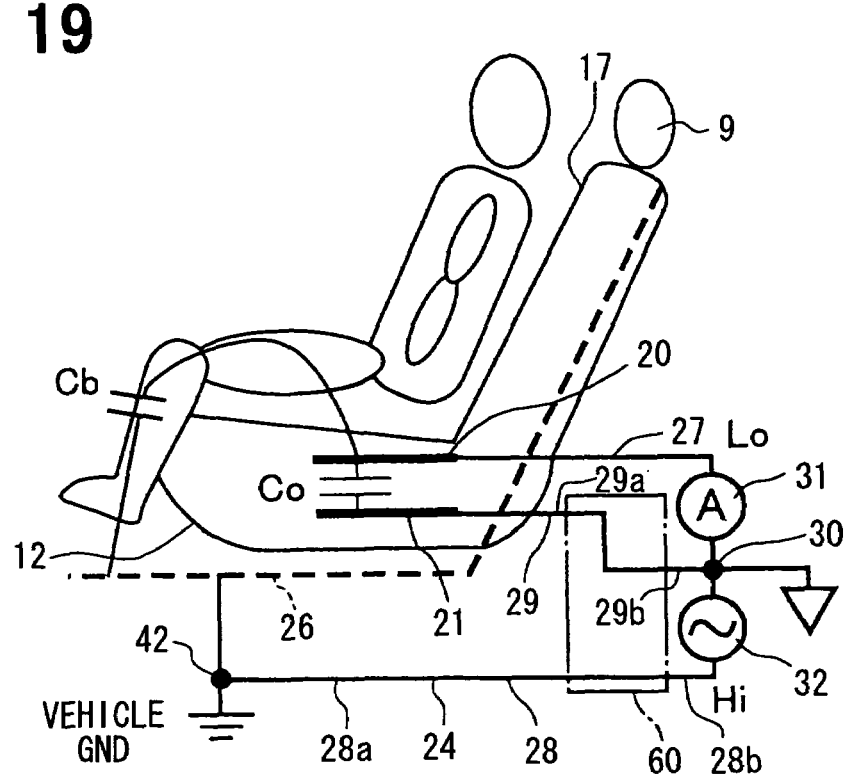
FIG. 19 is a diagram similar to that of FIG. 16 showing a modification of the capacitance-based sensor of the ninth embodiment.
Figure 20:
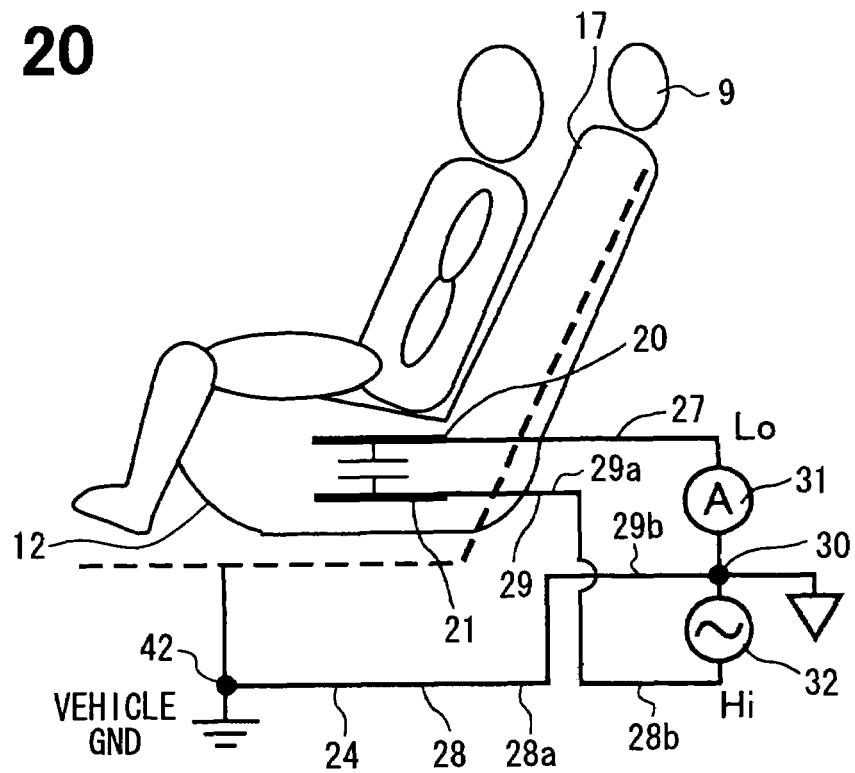
FIG. 20 is a diagram similar to that of FIG. 19 showing a malfunction sensing operational mode of the modification.

FIGS. 19 and 20 show a modification of the above-described arrangement shown in FIGS. 16-18. In this modification, the electric current sensing device 31 is provided in the conductive line 27, which extends from the occupant sensing electrode 20 to the intersecting point 30. The conductive line 29 extends from the empty seat capacitance reducing electrode 21 to the intersecting point 30. The drive device 32 is provided in the conductive line 28, which extends from the vehicle GND 42 to the intersecting point 30. In other words, the position of the drive device 32 and the position of the electric current sensing device 31 indicated in FIGS. 16-18 are switched in this modification shown in FIGS. 19 and 20. The rest of the structure is the same as that of the above embodiment. More specifically, the structure is the same as that of the first embodiment shown and described with reference to FIGS. 1 to 4 except the switch device 60, which is similar to the switch device 60 of FIG. 18.

In this modification, in the occupant state sensing operational mode shown in FIG. 19, the low electric potential is applied to the occupant sensing electrode 20 and the empty seat capacitance reducing electrode 21, and the high electric potential is applied to the vehicle GND 42. In the malfunction sensing operational mode shown in FIG. 20, the switch device 60 is placed in the second position. Thus, the conductive line 27 is connected to the conductive line 29 at the intersecting point 30. As a result, the low electric potential is applied to the occupant sensing electrode 20, and the high electric potential is applied to the empty seat capacitance reducing electrode 21. According to this modification, the advantages, similar to those of the above embodiment can be achieved.

TENTH EMBODIMENT

Figure 21:
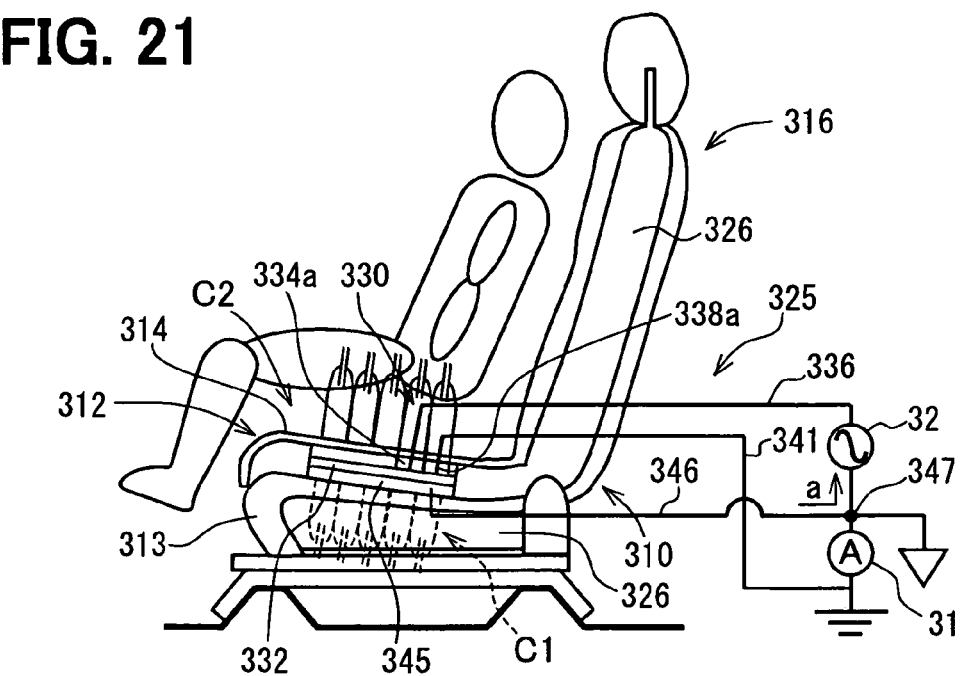
FIG. 21 is a diagram showing an overall structure of an occupant sensing system having a capacitance-based sensor according to a tenth embodiment of the present invention.

FIG. 21 shows an occupant sensing system having a capacitance-based sensor (occupant sensor) 325 according to a tenth embodiment. As shown in FIG. 21, a front passenger seat 310 includes a seat bottom 312 and a seatback 316. The seat bottom 312 includes a cushion member (cushion pad) 313 and an outer cover member (cushion cover) 314. A seat frame 326 of the seat 310 forms a skeletal structure of the seat bottom 312 and the seatback 316.

The sensor 325 includes an occupant sensing electrode 330, an empty seat capacitance reducing electrode 345, a drive device (a drive circuit) 32 and an electric current sensing device (an electric current sensing circuit) 31. The occupant sensing electrode 330 includes a group of high potential electrode portions (a first group of electrode portions) 334a-334c and a group of low potential electrode portions (a second group of electrode portions) 338a-338c. A leading line (a first conductive line) 336 is connected to the high potential electrode portions 334a-334c, and a leading line (a second conductive line) 341 is connected to the low potential electrode portions 338a-338c. The drive device 32 and the electric current sensing device 31 are connected in series between the leading line 336 and the leading line 341. The drive device 32 applies a high-frequency voltage (a drive voltage) between the high potential electrode portions 334a-334c and the low potential electrode portions 338a-338c. The electric current sensing device 31 measures an electric current, which flows between the high potential electrode portions 334a-334c and the low potential electrode portions 338a-338c. A leading line (a third conductive line) 346, which extends from the empty seat capacitance reducing electrode 345, is connected to an intersecting point (an intermediate point) 347 between the drive device 32 and the electric current sensing device 31. The high potential electrode portions 334a-334c and the low potential electrode portions 338a-338c are arranged on a top surface of a dielectric base film 332 (the first surface located on the first side or upper side of the dielectric base film 332) and are electrically insulated from the seat frame 326.

Figure 22:
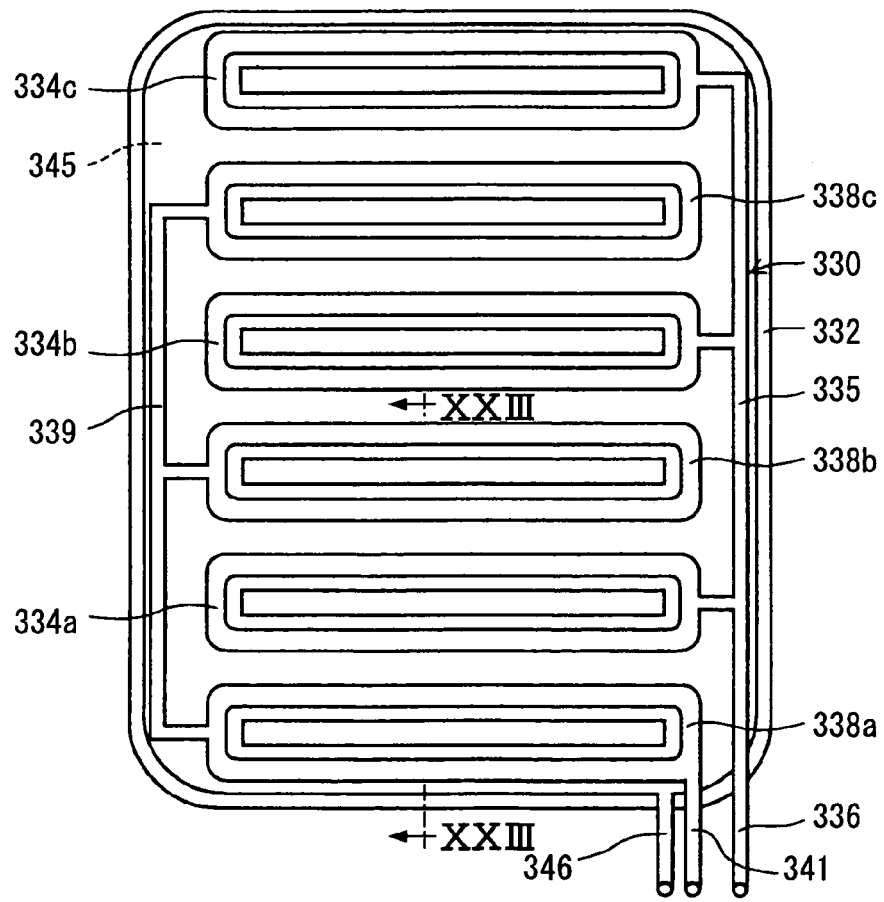
FIG. 22 is a plan view of the sensor having high potential electrode portions, low potential electrode portions and an empty seat capacitance reducing electrode.
Figure 23:
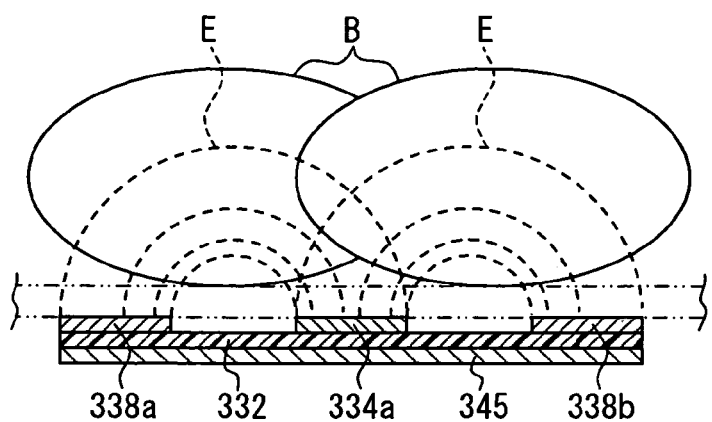
FIG. 23 is a cross sectional view along line XXIII-XXIII in FIG. 22.

FIGS. 22 and 23 show details of the high potential electrode portions 334a-334c, the low potential electrode portions 338a-338c and the empty seat capacitance reducing electrode 345. The dielectric base film 332 is made of, for example, the dielectric resin, such as the polyethylene terephthalate (PET). The three high potential electrode portions 334a-334c and the three low potential electrode portions 338a-338c are alternately arranged in a fore-and-aft direction (a top-to-bottom direction in FIG. 22) of the seat bottom 312, i.e., of the vehicle. Among the high potential electrode portions 334a-334c and the low potential electrode portions 338a-338c, the high potential electrode portion 334c and the low potential electrode portion 338c are placed on the front side of the seat bottom 312, i.e., of the vehicle. Each of the high potential electrode portions 334a-334c is formed into an elongated rectangular shape, and a longitudinal direction of the high potential electrode portion 334a-334c coincides with the transverse direction of the seat bottom 312, i.e., of the vehicle. The three high potential electrode portions 334a-334c are interconnected together by a connector 335 at one side (the right side in FIG. 22), and the leading line 336 extends rearward from the rear side high potential electrode portion 334a.

Each of the low potential electrode portions 338a-338c is formed into an elongated rectangular shape, and a longitudinal direction of the low potential electrode portion 338a-338c coincides with the transverse direction of the seat bottom 312, i.e., of the vehicle. The three low potential electrode portions 338a-338c are interconnected together by a connector 339 at the other side (the left side in FIG. 22), and the leading line 341 extends rearward from the rear side low potential electrode portion 338a. The empty seat capacitance reducing electrode 345, which is arranged on the bottom surface of the base film 332 (the second surface located on the second side or lower side of the base film 332), is made of an electrically conductive metal material and is formed into a rectangular shape that generally covers the entire bottom surface of the base film 332. The leading line 346 extends rearward from the rear edge of the empty seat capacitance reducing electrode 345.

Next, operation of the tenth embodiment will be described. The drive device 32 applies the high frequency voltage between the low potential electrode portions 338a-338c and the high potential electrode portions 334a-334c, so that a weak electric field E (FIG. 23) is generated. With reference to FIG. 21, when the occupant is not seated, i.e., is not present on the seat bottom 312, a capacitor C2 is created between the high potential electrode portions 334a-334c and the low potential electrode portions 338a-338c. Also, a capacitor (not shown) is created between the high potential electrode portions 334a-334c and the empty seat capacitance reducing electrode 345.

When the occupant is seated on the seat bottom 312, a portion (buttocks) of the occupant body is placed over the passage of the electric field E, so that a capacitance of the capacitor C2 is changed. The empty seat capacitance reducing electrode 345 is located between the seat frame 326 and the high and low potential electrode portions 334a-334c, 338a-338c. An electric potential of the empty seat capacitance reducing electrode 345 is the same as that of the low potential electrode portions 338a-338c. Furthermore, the electric current sensing device 31 is not placed between the high potential electrode portions 334a-334c and the empty seat capacitance reducing electrode 345. With this construction, the capacitance between the low potential electrode portions 338a-338c and the high potential electrode portions 334a-334c is measured through the electric current sensing device 31. However, the body side capacitance component between the empty seat capacitance reducing electrode 345 and the high potential electrode portions 334a-334c is not measured by the electric current sensing device 31 (see an arrow "a" indicating a current flow in FIG. 21). Therefore, based on a change in the capacitance, i.e., a change in the value of the measured electric current, which is caused by the presence of the occupant in the seat 310 and is measured by the electric current sensing device 31, the presence of the occupant on the seat bottom 312 can be effectively sensed.

The tenth embodiment provides the following advantages. First, even when the position of the occupant on the seat bottom 312 is deviated in the fore-and-aft direction, it is still possible to effectively and accurately sense the presence of the occupant on the seat bottom 312, and the influences of the change caused by the position or posture of the occupant will have less influence on this sensed result. Specifically, the three high potential electrode portions 334a-334c are interconnected by the connector 335, and the three low potential electrode portions 338a-338c are interconnected by the connector 339. Thus, as long as the buttocks B of the occupant are present between at least one of the high potential electrode portions 334a-334c and at least one of the low potential electrode portions 338a-338c, it is possible to sense the presence of the occupant on the seat bottom 312.

For example, the buttocks B may be located between the front side high potential electrode portion 334c and the front side low potential electrode portion 338c or may be located between the rear side high potential electrode portion 334a and the rear side low potential electrode portion 338a. Also, the buttocks B may be located between the center side low potential electrode portion 338b and the center side high potential electrode portion 334b or the rear side high potential electrode portion 334a. This is made possible by the presence of the three high potential electrode portions 334a-334c and the three low potential electrode portions 338a-338c on the top surface of the base film 332.

Furthermore, although the three high potential electrode portions 334a-334c and the three low potential electrode portions 338a-338c are arranged on the top surface of the base film 332, only the body side capacitance component of the capacitance generated between the low potential electrode portions 338a-338c and the high potential electrode portions 334a-334c is measured. That is, the cushion member 313 side capacitance component C1, which is easily changed under the influences of the cushion member 313, is not measured through the empty seat capacitance reducing electrode 345. Thus, the presence of the occupant in the seat 310 can be effectively sensed. This is made possible by the following arrangement. That is, the empty seat capacitance reducing electrode 345 is positioned on the bottom surface of the base film 332, and the electric potential of the empty seat capacitance reducing electrode 345 is made as the same as that of the low potential electrode portions 338a-338c, and the electric current sensing device 31 is not interposed between the high potential electrode portions 334a and the empty seat capacitance reducing electrode 345.

Next, modifications of the tenth embodiment will be described.

A first modification of the tenth embodiment will be described with reference to FIG. 24.

Figure 24:
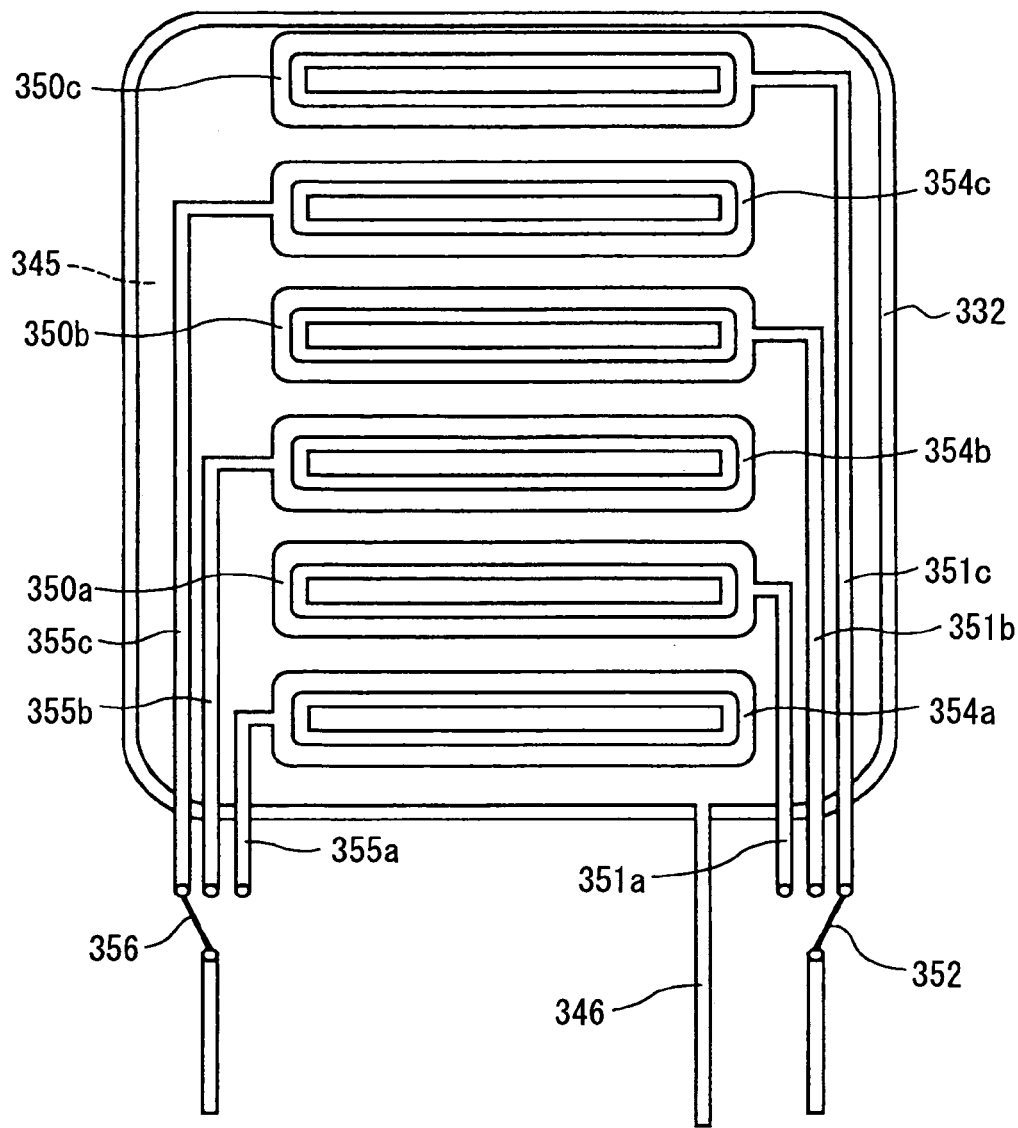
FIG. 24 is a plan view showing a first modification of the tenth embodiment.

In the first modification shown in FIG. 24, three high potential electrode portions (a first group of the electrode portions) 350a-350c and three low potential electrode portions (a second group of electrode portions) 354a-354c are alternately arranged on the top surface of the base film 332 above the empty seat capacitance reducing electrode 345. The three high potential electrode portions (rear side, center side and front side electrode portions) 350a-350c are electrically separated from each other. A leading line 351a extends rearward from the rear side high potential electrode portion 350a. A leading line 351b extends rearward from the center side high potential electrode portion 350b. Furthermore, a leading line 351c extends rearward from the front side high potential electrode portion 350c.

Furthermore, the three low potential electrode portions (rear side, center side and front side electrode portions) 354a-354c are electrically separated from each other. The leading lines 355a-355c extend rearward from the low potential electrode portions 354a-354c, respectively. Furthermore, two switches (first and second electrode portion selecting switch devices) 352, 356 are provided. The switch 352 is used to select and electrically connect one of the three high potential electrode portions 350a-350c to the conductive line 336 and thereby to the drive device 32 of FIG. 21, and the switch 356 is used to select and electrically connect one of the three low potential electrode portions 354a-354c to the conductive line 341 and thereby to the current sensing device 31 of FIG. 21.

According to this modification, the best one of the high potential electrode portions 350a-350c and the best one of the low potential electrode portions 354a-354c can be selected in view of, for example, the body size of the occupant on the seat bottom 312. For example, when an infant is present in the seat 310, the buttocks of the infant are not likely placed over the entire top surface of the seat bottom 312. Therefore, in such a case, it may be assumed that the infant is present generally in the center of the seat bottom 312, and the center side high potential electrode portion 350b may be selected through the first switch 352, and the center side low potential electrode portion 354b may be selected through the second switch 356. This is also true in a case where the child seat is installed on the seat bottom 312, and the infant is present in the child seat. Thus, the above described selection of the center side high potential electrode portion 350b through the first switch 352 and the above described selection of the center side low potential electrode portion 354b through the second switch 356 should be made.

Figure 25A:
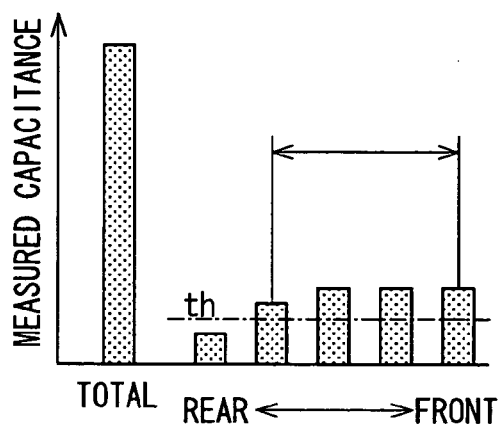
FIGS. 25A and 25B are graphs used for describing an exemplary use of the first modification.
Figure 25B:
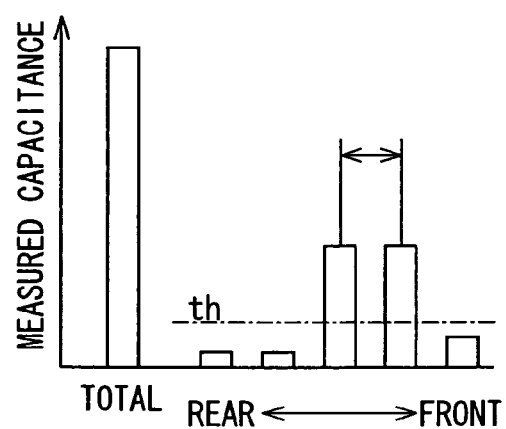

FIGS. 25A to 26B show an exemplary use of the first modification where the occupant sensing electrode includes a first group of electrode portions (high potential electrode portions) and a second group of electrode portions (low potential electrode portions), which are selectively switched through switches similar to the switches 352, 356. Specifically, in FIGS. 25A and 25B, five sets of electrode portions (high potential electrode portions and low potential electrode portions) of the occupant sensing electrode are arranged one after another in the fore-and-aft direction on the seat bottom 312. Specifically, in FIGS. 25A and 25B, the five sets of electrode portions are respectively indicated in the transverse axis, and the measured capacitance is indicated in the vertical axis. When the switches are sequentially displaced from one position to another position through all of the five positions, the capacitance is measured through the five sets of electrode portions, respectively. Specifically, FIG. 25A shows the case where the occupant is wearing an overdress (or a thick cloth). In such a case, the buttocks of the occupant are placed further away from the electrode portions of the occupant sensing electrode due to the presence of the overdress, and the measured capacitance is comparatively small in each set of electrodes. More specifically, only the measured capacitance of center side set of electrode portions and the measured capacitances of the following front side sets of electrodes slightly exceed a threshold value th. In contrast, FIG. 25B shows a case where the child seat is present in the passenger seat. In this case, the buttocks of the child are placed close to the center side set of electrode portions, so that the measured capacitance of the center side set of electrode portions and the measured capacitance of the following front side set of electrode portions exceed the threshold value th.

Figure 26A:
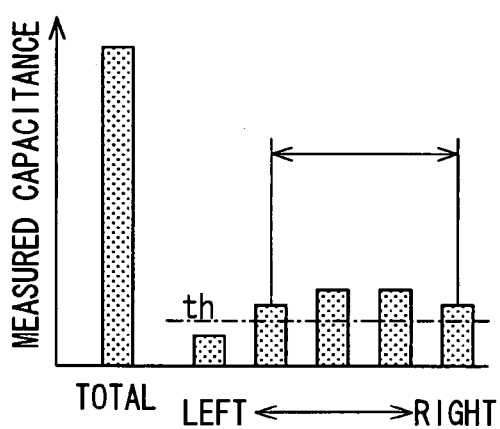
FIGS. 26A and 26B are graphs used for describing another exemplary use of the first modification.
Figure 26B:
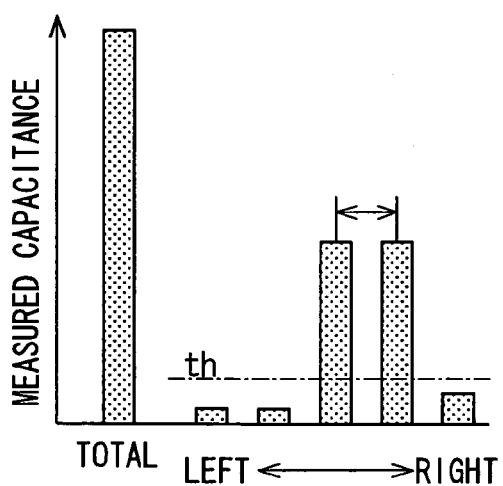

FIGS. 26A and 26B show cases where the five sets of electrode portions are arranged one after another in the transverse direction (transverse direction of the vehicle) on the seat bottom 312. More specifically, FIG. 26A shows the case where the occupant is wearing the overdress (the thick cloth), and FIG. 26B shows the case where the child is seating on the seat bottom 312 without using the child seat. In the case of the adult, the buttocks are placed further away from the electrode portions of the occupant sensing electrode. Thus, the measured capacitance of the center side set of electrode portions and the measured capacitances of the following right side sets of electrode portions slightly exceed the threshold value th. In the case of the child seating directly on the seat bottom, the buttocks are placed closer to the center side set of electrode portions, so that the measured capacitance of the center side set of electrode portions and the measured capacitance of the next right side set of electrode portions substantially exceed the threshold value th.

Figure 27:
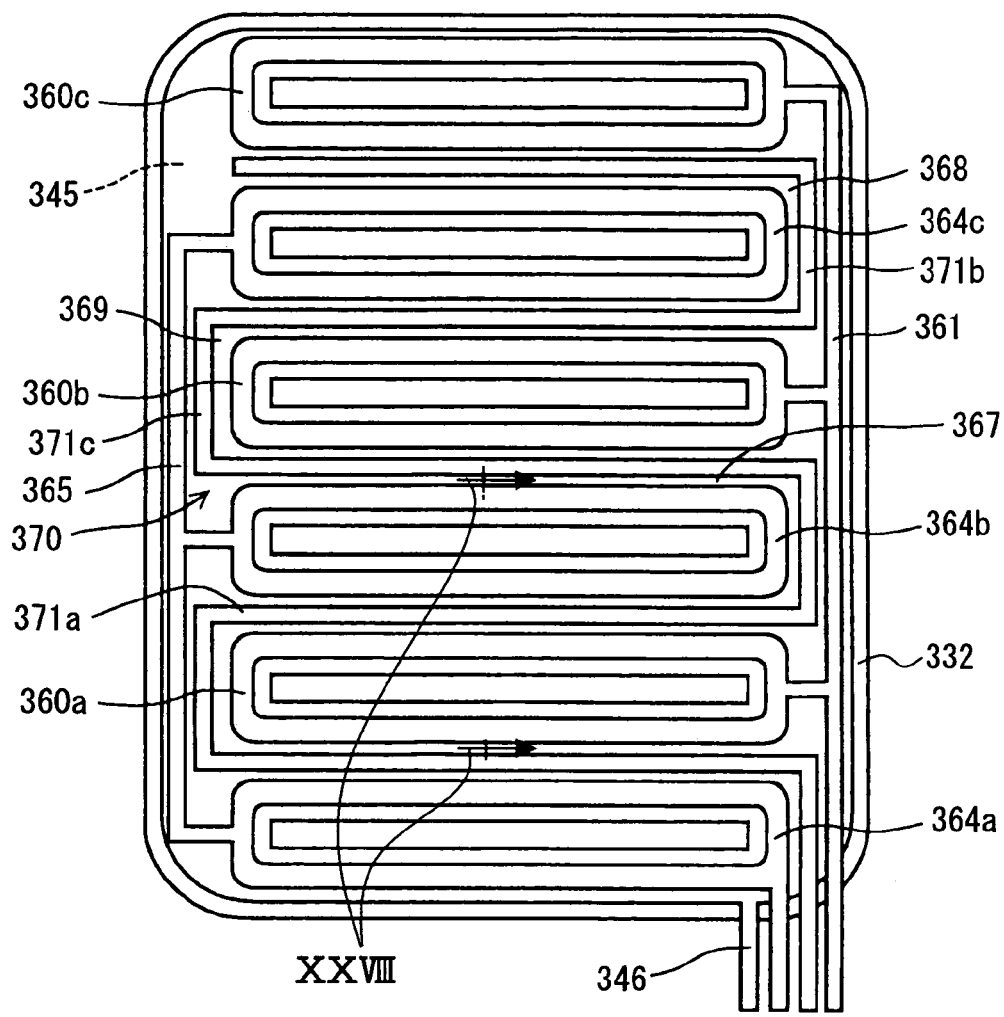
FIG. 27 is a plan view showing a second modification of the tenth embodiment.
Figure 28:
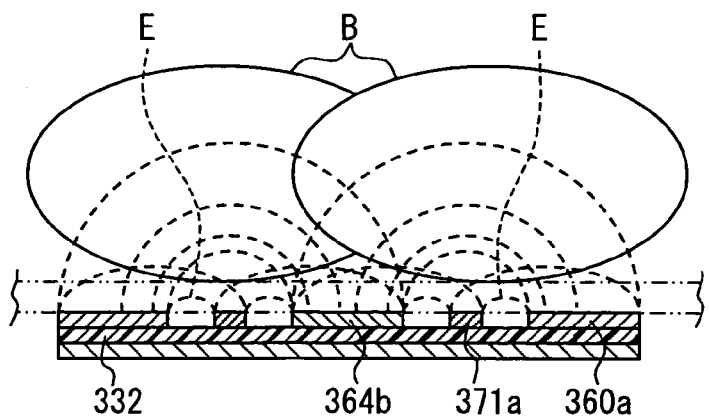
FIG. 28 is a cross sectional view along line XXVIII-XXVIII in FIG. 27.

Next, a second modification of the tenth embodiment will be described with reference to FIGS. 27 and 28. Similar to the above tenth embodiment described with reference to FIGS. 21 to 23, the three high potential electrode portions (the first group of electrode portions) 360a-360c are connected together through the connector 361, and the three low potential electrode portions (the second group of electrode portions) 364a-364c are connected together through the connector 365. An auxiliary electrode 370 extends in a respective space, which is defined between each of the electrode portions 360a-360c and an adjacent one of the electrode portions 364a-364c. More specifically, the auxiliary electrode 370 extends in a meander-like fashion in a space 367, which is defined between the adjacent electrode portions 360a-360c, 364a-364c, and in spaces 368, 369, which are defined between the electrode portions 360a-360c, 364a-364c and the connectors 361, 365.

The auxiliary electrode 370 is formed by bending a single elongated electrode and includes five portions 371a, two right side portions 371b and two left side portions 371c. For instance, the drive device 32 applies a relatively high electric potential to the three electrode portions 360a-360c and the three electrode portions 364a-364c and a relatively low electric potential to the auxiliary electrode 370.

According to the second modification, an electric field is formed by a capacitor, which is created between the auxiliary electrode 370 and the first and second groups of electrode portions 360a-360c, 364a-364c. Because of the arrangement of the auxiliary electrode 370, the electric field E is formed in a closer area, which is closer to the top surface of the base film 332 in comparison to the electric field formed only by the electrode portions 360a-360c, 364a-364c of FIGS. 21 to 23. For example, when water is spilled over the seat bottom 312 to wet the occupant sensor 325, a change in the capacitance caused by the spill of the water can be sensed. Also, when the temperature or humidity of the seat bottom 312 becomes relatively high, a change in the capacitance caused by the relatively high temperature or high humidity can be sensed. The change in the capacitance caused by the above external disturbance may be used to correct the threshold value used in the occupant determination or to provide a warning whenever there is a high possibility of erroneous occupant determination. In some cases, the circuit construction may be changed to enable switching of the above operation using the auxiliary electrode 370 and the electrode portions 360a-360c, 364a-364c to the one described with reference to FIGS. 21 to 23 using only the high potential electrode portions 360a-360c and the low potential electrode portions 364a-364c.

A third modification of the tenth embodiment will be described with reference to FIGS. 29 to 30B. In the third modification, three high potential electrode portions 375a-375c and three low potential electrode portions 377a-377c are arranged in a manner similar to the second modification, and a space 378 is created like in the second modification. However, in place of the auxiliary electrode 370 of FIG. 27, an upper pressure sensitive electrode (a first pressure sensitive electrode) 381 extends in the space 378 in a meander like fashion on the top surface of the base film 332. A lower pressure sensitive electrode (a second pressure sensitive electrode) 382 is arranged on the second side of the base film 332 in an opposed relationship to the upper pressure sensitive electrode 381. The upper pressure sensitive electrode 381 and the lower pressure sensitive electrode 382 form a plurality of pressure sensitive switches 380. As shown in FIG. 30A, in this modification, the empty seat capacitance reducing electrode 345 is arranged below the lower pressure sensitive electrode 382 in such a manner that dielectric resin 333 is interposed between the lower pressure sensitive electrode 382 and the empty seat capacitance reducing electrode 345. In this case, the base film 332 and the dielectric resin 333 may be formed integrally, if desired. The capacitance-based sensor can relatively accurately sense approaching of the occupant body. However, accuracy of the capacitance-based sensor for sensing approaching of an object (e.g., a child seat) other than the occupant body is not as high as that of sensing the approaching of the occupant body. In view of this point, the pressure sensitive switches 380 are provided in addition to the capacitance-based sensor.

Figure 29:
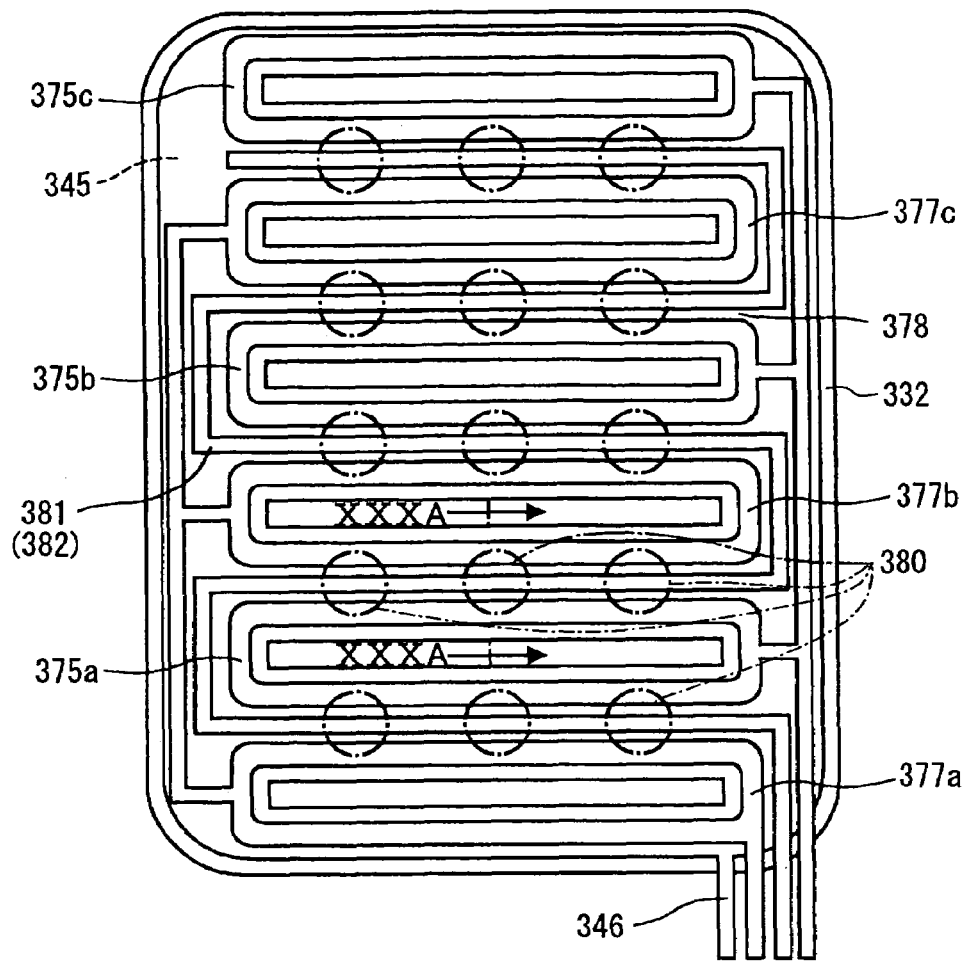
FIG. 29 is a plan view showing a third modification of the tenth embodiment.
Figure 30A:
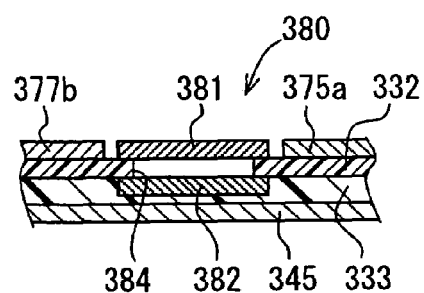
FIG. 30A is a cross sectional view along line XXXA-XXXA in FIG. 29.

Specifically, in the case of FIG. 30A, which shows the cross section taken along line XXXA-XXXA in FIG. 29, the upper pressure sensitive electrode 381 is arranged between the high potential electrode portion 375a and the low potential electrode portion 377b on the top surface of the base film 332. The lower pressure sensitive electrode 382 is arranged on the bottom surface of the base film 332 at a location that is opposed to the upper pressure sensitive electrode 381. A plurality of through holes 384 penetrates through a region of the base film 332, which is interposed between the upper pressure sensitive electrode 381 and the lower pressure sensitive electrode 382. Each pressure sensitive switch 380 is formed by the upper pressure sensitive electrode 381, the lower pressure sensitive electrode 382 and the corresponding through hole 384 of the base film 332. The upper pressure sensitive electrode 381 and the lower pressure sensitive electrode 382 can be easily formed by a manner similar to that of forming the high potential electrode portions 375a-375c and the low potential electrode portion 377a-377c.

For instance, when the child seat is installed in the front passenger seat, the upper pressure sensitive electrode 381 is pressed downward by the child seat and contacts the lower pressure sensitive electrode 382 to cause short circuiting between the upper pressure sensitive electrode 381 and the lower pressure sensitive electrode 382. Upon sensing the short circuiting between the upper pressure sensitive electrode 381 and the lower pressure sensitive electrode 382, the occupant sensing ECU senses the installation of the child seat in the front passenger seat. For example, when the seat belt is not fastened upon the installation of the child seat, a warning may be provided based on the sensed result of the pressure sensitive switch 380 to ask fastening of the seat belt. Also, the pressure sensitive switches 380 can be easily formed, so that an increase in the costs can be minimized.

Figure 30B:
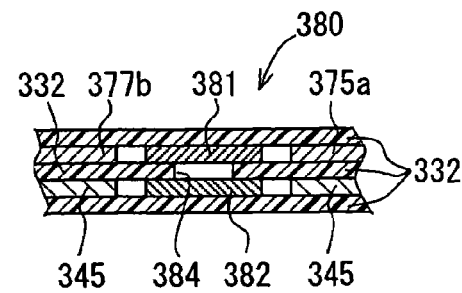
FIG. 30B is a cross sectional view showing a modification of FIG. 30A.

The above modification shown in FIGS. 29 and 30A can be further modified in a manner shown in FIG. 30B. Specifically, in the case of FIGS. 29 and 30A, the empty seat capacitance reducing electrode 345 is placed below the lower pressure sensitive electrode 382 in such a manner that the dielectric resin 333 is placed between the lower pressure sensitive electrode 382 and the empty seat capacitance reducing electrode 345. Alternatively, as shown in FIG. 30B, a space, which has a meander like shape that corresponds to the shape of the lower pressure sensitive electrode 382, may be formed in the empty seat capacitance reducing electrode 345, and the lower pressure sensitive electrode 382 may be arranged in this meander like space without contacting the empty seat capacitance reducing electrode 345. With this arrangement, the thickness of the occupant sensor 325 in the vertical direction in FIG. 30B can be reduced in comparison to that of FIG. 30A. In this way, more comfortable seating feeling of the occupant on the sensor can be attained in comparison to that of FIG. 30A. Furthermore, as shown in FIG. 30B, like the resin films 221 of the sixth embodiment, two additional dielectric films (dielectric sheets or dielectric layers) 332 may be provided on an upper side of the high and low potential electrode portions 375a-375c, 377a-377c and a lower side of the empty seat capacitance reducing electrode 345 and the lower pressure sensitive electrode 382, if desired or required. Similarly, in each of the above other embodiments and its modifications, an additional dielectric film may be provided on the upper side of the occupant sensing electrode, and another additional dielectric film may be provided on a lower side of the empty seat capacitance reducing electrode. Furthermore, one or more of the films may be formed integrally.

ELEVENTH EMBODIMENT

Figure 31:
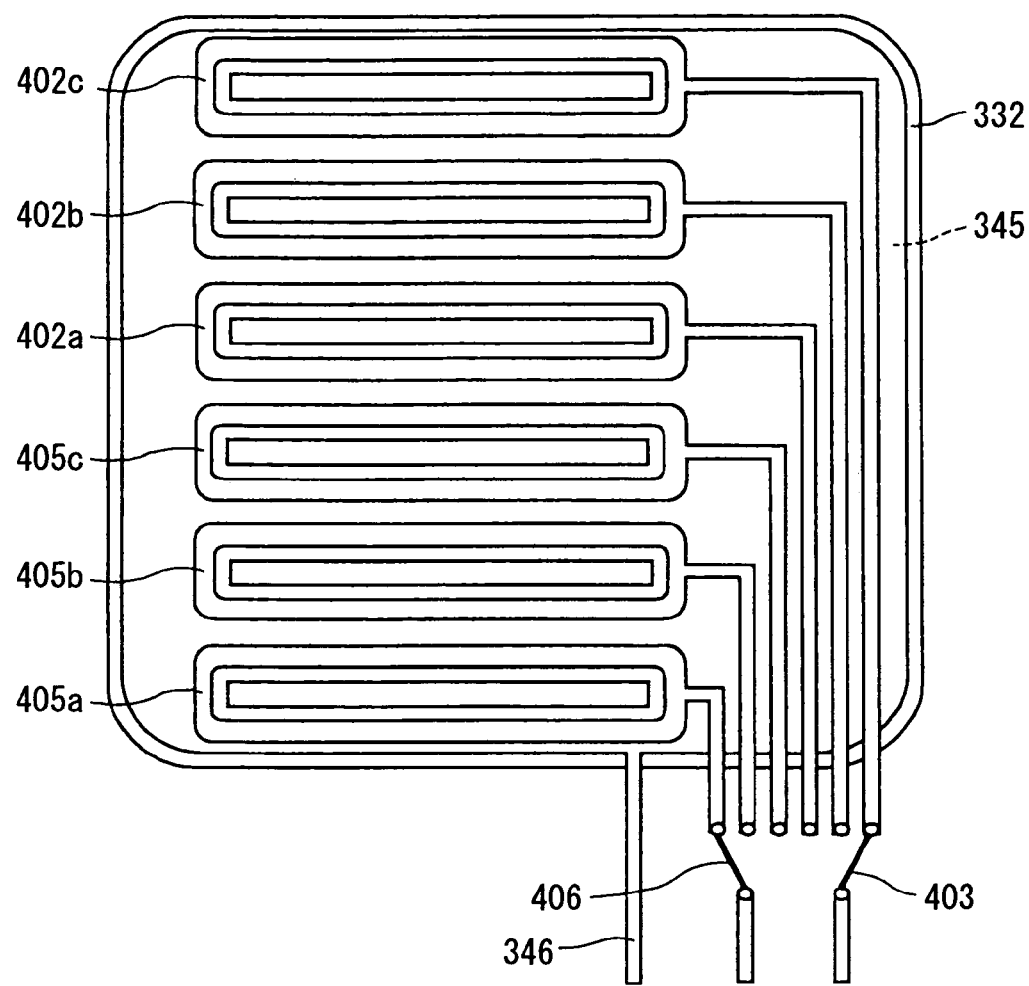
FIG. 31 is a plan view showing a capacitance-based sensor according to an eleventh embodiment of the present invention.

An eleventh embodiment shown in FIG. 31 differs from the tenth embodiment shown in FIGS. 21 to 23 in terms of the arrangement of the high and low potential electrode portions. Specifically, the occupant sensing electrode includes three separated high potential electrode portions (a first group of electrode portions) 402a-402c and three separated low potential electrode portions (a second group of electrode portions) 405a-405c. The high potential electrode portions 402a-402c are arranged on a front side of the top surface of the base film 332 (and of the empty seat capacitance reducing electrode 345), and the low potential electrode portions 405a-405c are arranged on a rear side of the top surface of the base film 332 (and of the empty seat capacitance reducing electrode 345). Furthermore, first and second switches (first and second electrode portion selecting switch devices) 403, 406 are provided. The first switch 403 is used to select and electrically connect one of the three high potential electrode portions 402a-402c to the conductive line 336 and thereby to the drive device 32 of FIG. 21, and the second switch 406 is used to select and electrically connect one of the three low potential electrode portions 405a-405c to the conductive line 341 and thereby to the current sensing device 31 of FIG. 21.

The empty seat capacitance reducing electrode 345 is arranged on the bottom surface of the base film 332. The drive device 32 (see FIG. 21) applies a voltage between the selected one of the high potential electrode portions 402a-402c and the selected one of the low potential electrode portions 405a-405c. The electric current sensing device 31 measures an electric current between the selected one of the high potential electrode portions 402a-402c and the selected one of the low potential electrode portions 405a-405c. The high potential electrode portions 402a-402c and the low potential electrode portions 405a-405c are electrically insulated from the seat frame 326.

According to the eleventh embodiment, various seating patterns can be sensed. For example, the high potential electrode portion 402a, which is located in the center side of the seat bottom 312 in the fore-and-aft direction, and the low potential electrode portion 405a, which is located on the rear side of the seat bottom 312 in the fore-and-aft direction, can be used to sense the presence of the occupant on the seat bottom 312. Also, the intermediate side high potential electrode portions 402b and the intermediate side low potential electrode portion 405b may be used to sense the presence of the occupant on the seat bottom 312. Furthermore, the front side high potential electrode portion 402c and the front side low potential electrode portion 405c may be used to sense the presence of the occupant on the seat bottom 312.

The empty seat capacitance reducing electrode 345, which is arranged on the bottom surface of the base film 332, allows a reduction in the capacitance between the selected one of the high potential electrode portions 402a-402c and the selected one of the low potential electrode portions 405a-405c. It should be noted that the first switch 403 may be used to sequentially select the high potential electrode portions 402a-402c, and the second switch 406 may be used to sequentially select the low potential electrode portions 405a-405c.

TWELFTH EMBODIMENT

Figure 32:
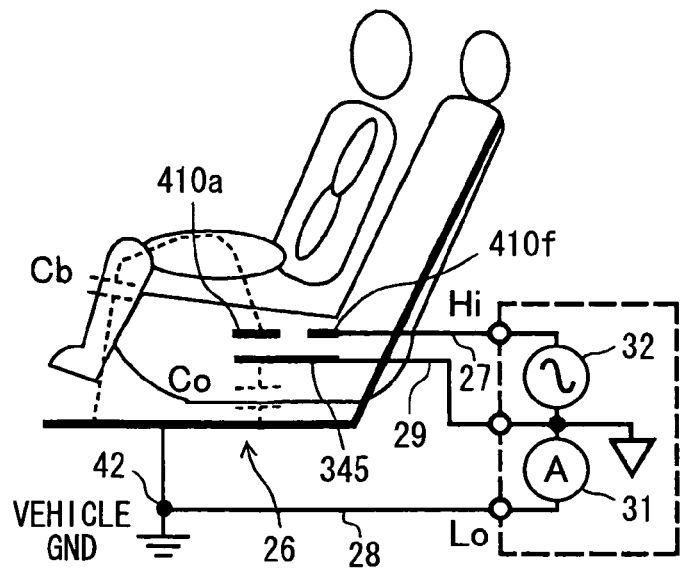
FIG. 32 is a schematic view showing an occupant sensing system having a capacitance-based sensor according to an twelfth embodiment of the present invention.
Figure 33:
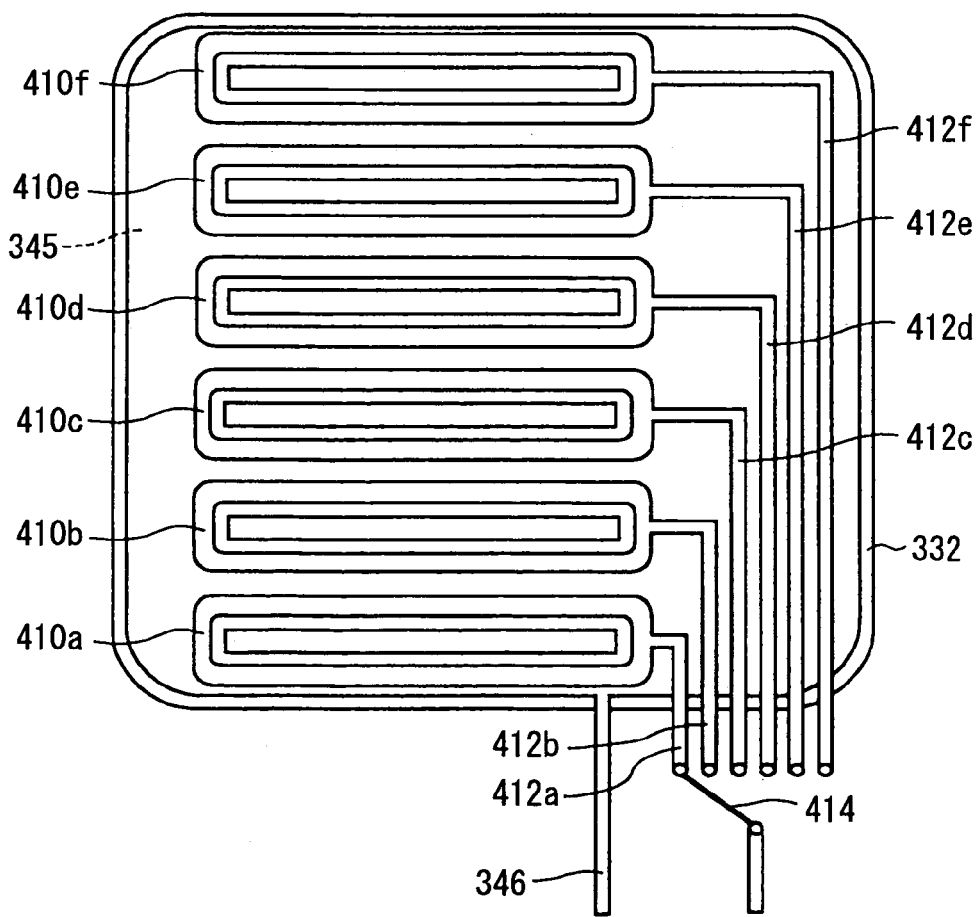
FIG. 33 is a plan view of the sensor of the twelfth embodiment.

FIGS. 32 and 33 show a twelfth embodiment. The twelfth embodiment is similar to the second embodiment shown in FIG. 5 except the arrangement of the occupant sensing electrode. Specifically, the occupant sensing electrode of the twelfth embodiment includes only the high potential electrode portions 410a-410f, which are arranged on the top surface of the base film 332. The seat frame 26, which is electrically connected to the vehicle GND 42, serves as a low potential electrode (or a low potential electrode portion).

More specifically, six high potential electrode portions 410a-410f are spaced from one another in a parallel relationship and are arranged one after another in the fore-and-aft direction, and each of the high potential electrode portions 410a-410f has an elongated rectangular shape. Leading lines (leading portions) 412a-412f extend from the lateral sides of the high potential electrode portions 410a-410f, respectively. A switch (an electrode portion selecting switch device) 414 selectively, electrically connects one of the high potential electrode portions 410a-410f to the conductive line 27 and thereby to the drive device 32.

The empty seat capacitance reducing electrode 345 is arranged on the bottom surface of the base film 332. The drive device 32 applies a voltage between the selected one of the high potential electrode portions 410a-410f and the seat frame 26. The electric current sensing device 31 measures the electric current, which flow between the selected one of the high potential electrode portions 410a-410f and the low potential electrode (the seat frame) 26.

According to the twelfth embodiment, one of the high potential electrode portions 410a-410f is selected by switching the switch 414 in view of, for example, the body size of the occupant. The presence of the occupant is effectively sensed through use of the selected one of the high potential electrode portions 410a-410f and the seat frame 26. Furthermore, the empty seat capacitance reducing electrode 345, which is arranged on the bottom surface of the base film 332, allows a reduction in the capacitance between the selected one of the high potential electrode portions 410a-410c and the low potential electrode (the seat frame) 26. Also, since the seat frame 26, which is originally present in the seat 310, is effectively used as the low potential electrode, there is no need to provide an additional low potential electrode.

Additional advantages and modifications will readily occur to those skilled in the art. The invention in its broader terms is therefore not limited to the specific details, representative apparatus, and illustrative examples shown and described. Furthermore, any feature of the sensor or of the occupant sensing system described in one of the above embodiments and modifications can be combined with or replaced with any one or more features of another one of the above embodiments and modifications. For example, in the twelfth embodiment shown in FIGS. 32 and 33, the high electric potential is applied to the electrode portions 410a-410f of the occupant sensing electrode. Alternatively, the electrode portions 410a-410f of the occupant sensing electrode and the switch 414 shown in FIGS. 32 and 33 may be replaced with the occupant sensing electrode 20 of the first embodiment shown in FIGS. 1 to 4. In this way, the low electric potential is applied to the electrode portions 410a-410f of the occupant sensing electrode. Also, the line selecting switch device 60 of the ninth embodiment shown in FIG. 18 may be applied to the twelfth embodiment shown in FIGS. 32 and 33 or any other one of the above described embodiments and modifications. Furthermore, it should be noted that the terms of the high electric potential (the relatively high electric potential) and the low electric potential (the relatively low electric potential) used above are not limited to any specific values and should be considered to indicate a relationship between the two potentials, i.e., the high electric potential being higher than the low electric potential and vice versa.

What is claimed is:

1. A capacitance-based sensor that is arranged in a seat of a vehicle and senses presence of an occupant in the seat, the capacitance-based sensor comprising:
    an occupant sensing electrode that is embedded in the seat;
    an empty seat capacitance reducing electrode that is placed between the occupant sensing electrode and a seat frame of the seat, which is connected to a vehicle ground, wherein the occupant sensing electrode is connected to the vehicle ground, and the empty seat capacitance reducing electrode is connected to an intersecting point which connects between the occupant sensing electrode and the vehicle ground;
    an electric current sensing device that measures an electric current and is inserted in one of a first location, which connects between the occupant sensing electrode and the intersecting point, and a second location, which connects between the vehicle ground and the intersecting point; and
    a drive device that generates a drive voltage and is inserted in the other one of the first location and the second location, wherein the empty seat capacitance reducing electrode is connected to the intersecting point to reduce a capacitance that is measured with the electrical current sensing device in an empty state of the seat where the occupant is not present on the seat; wherein
    in an occupant sensing operational mode of the capacitance-based sensor for sensing the occupant on the seat, the drive device applies a voltage between the occupant sensing electrode and the vehicle ground, and the electric current sensing device measures an electric current between the occupant sensing electrode and the vehicle ground;
    in a malfunction sensing operational mode of the capacitance-based sensor for sensing a malfunction of the capacitance-based sensor, the drive device applies a voltage between the occupant sensing electrode and the empty seat capacitance reducing electrode, and the electric current sensing device measures an electric current between the occupant sensing electrode and the empty seat capacitance reducing electrode;
    in the occupant sensing operational mode of the capacitance-based sensor, the drive device and the electric current sensing device are connected in series between the occupant sensing electrode and the vehicle ground in this order, and the empty seat capacitance reducing electrode has the same electric potential as that of the vehicle ground; and
    in the malfunction sensing operational mode of the capacitance-based sensor, the drive device and the electric current sensing device are connected in series between the occupant sensing electrode and the empty seat capacitance reducing electrode in this order.

2. The capacitance-based sensor according to claim 1, wherein:
    the electric current sensing device is placed in the first location; and
    the drive device is placed in the second location.

3. The capacitance-based sensor according to claim 2, wherein the occupant sensing electrode has the same electric potential as that of the empty seat capacitance reducing electrode upon operation of the drive device.

4. The capacitance-based sensor according to claim 1, wherein:
    the electric current sensing device is placed in the second location; and
    the drive device is placed in the first location.

5. The capacitance-based sensor according to claim 4, wherein the empty seat capacitance reducing electrode has the same electric potential as that of the vehicle ground upon operation of the drive device.

6. The capacitance-based sensor according to claim 1, wherein the electric current sensing device includes an operational amplifier, which keeps the same electric potential and electric insulation between corresponding two of the occupant sensing electrode, the empty seat capacitance reducing electrode and the vehicle ground, between which the electric current sensing device is connected.

7. The capacitance-based sensor according to claim 1, wherein:
the occupant sensing electrode and the intersecting point are connected to each other through a first conductive line;
the vehicle ground and the intersecting point are connected to each other through a second conductive line;
at least a portion of the first conductive line and at least a portion of the second conductive line are formed as a shielded line that has a shield portion, which has the same electric potential as that of the empty seat capacitance reducing electrode upon operation of the drive device.

8. The capacitance-based sensor according to claim 7, wherein the empty seat capacitance reducing electrode is electrically connected to the electric current sensing device and the drive device through the shield portion of the shielded line.

9. The capacitance-based sensor according to claim 1, further comprising a dielectric layer, wherein the occupant sensing electrode is provided on a first side of the dielectric layer, and the empty seat capacitance reducing electrode is provided on a second side of the dielectric layer, which is opposite from the first side of the dielectric layer.

10. The capacitance-based sensor according to claim 9, wherein a surface of the occupant sensing electrode and a surface of the empty seat capacitance reducing electrode are coated with a dielectric material.

11. The capacitance-based sensor according to claim 1, wherein a surface area of the empty seat capacitance reducing electrode is smaller than a surface area of the occupant sensing electrode.

12. The capacitance-based sensor according to claim 1, wherein a surface area of the empty seat capacitance reducing electrode is larger than a surface area of the occupant sensing electrode.

13. The capacitance-based sensor according to claim 1, wherein in each of the occupant state sensing operational mode and the malfunction sensing operational mode of the capacitance-based sensor, the occupant sensing electrode has a high electric potential, and the empty seat capacitance reducing electrode and the vehicle ground has a low electric potential, which is lower than the high electric potential.

14. The capacitance-based sensor according to claim 13, further comprising:
a first conductive line that has the drive device, which is interposed between a first end and a second end of the first conductive line, wherein the first end of the first conductive line is directly connected to the occupant sensing electrode;
a second conductive line that has the electric current sensing device, which is interposed between a first end and a second end of the second conductive line, wherein the first end of the second conductive line is directly connected to vehicle ground, and the second end of the second conductive line is connected to the second end of the first conductive line;
a third conductive line that has a first end, which is directly connected to the empty seat capacitance reducing electrode, and a second end, which is connected to the second end of the first conductive line and the second end of the second conductive line; and a line selecting switch device that executes switching for the second conductive line and the third conductive line, wherein:
the line selecting switch device divides the second conductive line into:
a first part that includes the first end of the second conductive line, which is directly connected to the vehicle ground; and
a second part that includes the second end of the second conductive line and the electric current sensing device;
the line selecting switch device divides the third conductive line into:
a first part that includes the first end of the third conductive line, which is directly connected to the empty seat capacitance reducing electrode; and
a second part that includes the second end of the third conductive line, which is connected to the second end of the first conductive line and the second end of the second conductive line;
in the occupant state sensing operational mode of the capacitance-based sensor, the line selecting switch device electrically connects between the first part of the second conductive line and the second part of the second conductive line and also electrically connects between the first part of the third conductive line and the second part of the third conductive line; and
in the malfunction sensing operational mode of the capacitance-based sensor, the line selecting switch device electrically connects between the first part of the third conductive line and the second part of the second conductive line, so that the occupant sensing electrode is electrically connected to the empty seat capacitance reducing electrode through the drive device and the electric current sensing device.

15. The capacitance-based sensor according to claim 1, wherein:
the occupant sensing electrode includes a group of electrode portions, each of which is electrically separated from the rest of the electrode portions of the group; and
the capacitance-based sensor further comprising an electrode portion selecting switch device, which electrically connects one of the electrode portions of the group to the drive device and the electric current sensing device.

16. The capacitance-based sensor according to claim 15, wherein upon operation of the drive device, the empty seat capacitance reducing electrode has an electrical potential that is the same as that of the vehicle ground.

17. The capacitance-based sensor according to claim 15, wherein the electrode portions of the group are arranged in parallel and are spaced from one another in one of a fore-and-aft direction of the vehicle and a transverse direction of the vehicle.

18. An occupant sensing system comprising:
the capacitance-based sensor according to claim 1; and
an occupant sensing ECU that determines an occupant state of the seat based on an output of the capacitance-based sensor.

19. The occupant sensing system according to claim 18, wherein:
the occupant sensing ECU receives an output of a belt buckle switch device of the seat; and
when the occupant sensing ECU senses an unbuckled state of a seat belt of the seat based on the output of the belt buckle switch device, the occupant sensing ECU determines that the seat is empty and has no child restraint system installed therein.

20. A capacitance-based sensor that is arranged in a seat of a vehicle and senses presence of an occupant in the seat, the capacitance-based sensor comprising:

an occupant sensing electrode that is embedded in the seat;
an empty seat capacitance reducing electrode that is placed between the occupant sensing electrode and a seat frame of the seat, which is connected to a vehicle ground, wherein the occupant sensing electrode is connected to the vehicle ground, and the empty seat capacitance reducing electrode is connected to an intersecting point which connects between the occupant sensing electrode and the vehicle ground;
an electric current sensing device that measures an electric current and is inserted in one of a first location, which connects between the occupant sensing electrode and the intersecting point, and a second location, which connects between the vehicle ground and the intersecting point; and
a drive device that generates a drive voltage and is inserted in the other one of the first location and the second location, wherein the empty seat capacitance reducing electrode is connected to the intersecting point to reduce a capacitance that is measured with the electrical current sensing device in an empty state of the seat where the occupant is not present on the seat; wherein
in the occupant sensing operational mode of the capacitance-based sensor, the drive device and the electric current sensing device are connected in series between the occupant sensing electrode and the vehicle ground in this order, and the empty seat capacitance reducing electrode has the same electric potential as that of the vehicle ground; and
in the malfunction sensing operational mode of the capacitance-based sensor, the drive device and the electric current sensing device are connected in series between the occupant sensing electrode and the empty seat capacitance reducing electrode in this order;
in the occupant sensing operational mode of the capacitance-based sensor, the electric current sensing device and the drive device are connected in series between the occupant sensing electrode and the vehicle ground in this order, and the occupant sensing electrode has the same electric potential as that of the empty seat capacitance reducing electrode; and
in the malfunction sensing operational mode of the capacitance-based sensor, the electric current sensing device and the drive device are connected in series between the occupant sensing electrode and the empty seat capacitance reducing electrode in this order;
in the occupant sensing operational mode of the capacitance-based sensor, the vehicle ground has a relatively high electric potential, and the occupant sensing electrode and the empty seat capacitance reducing electrode have a relatively low electric potential;
in the malfunction sensing operational mode of the capacitance-based sensor, the occupant sensing electrode and the vehicle ground have a relatively low electric potential, and the empty seat capacitance reducing electrode has a relatively high electric potential; the capacitance-based sensor further comprising:
a first conductive line that has the electric current sensing device, which is interposed between a first end and a second end of the first conductive line, wherein the first end of the first conductive line is directly connected to the occupant sensing electrode;
a second conductive line that has the drive device, which is interposed between a first end and a second end of the second conductive line, wherein the first end of the second conductive line is directly connected to the vehicle ground, and the second end of the second conductive line is connected to the second end of the first conductive line;
a third conductive line that has a first end, which is directly connected to the empty seat capacitance reducing electrode, and a second end, which is connected to the second end of the first conductive line and the second end of the second conductive line; and
a line selecting switch device that executes switching for the second conductive line and the third conductive line, wherein:
the line selecting switch device divides the second conductive line into:
a first part that includes the first end of the second conductive line, which is directly connected to the vehicle ground; and
a second part that includes the second end of the second conductive line and the drive device;
the line selecting switch device divides the third conductive line into:
a first part that includes the first end of the third conductive line, which is directly connected to the empty seat capacitance reducing electrode; and
a second part that includes the second end of the third conductive line, which is connected to the second end of the first conductive line and the second end of the second conductive line;
in the occupant state sensing operational mode of the capacitance-based sensor, the line selecting switch device electrically connects between the first part of the second conductive line and the second part of the second conductive line and also electrically connects between the first part of the third conductive line and the second part of the third conductive line; and
in the malfunction sensing operational mode of the capacitance-based sensor, the line selecting switch device electrically connects between the first part of the third conductive line and the second part of the second conductive line, so that the occupant sensing electrode is electrically connected to the empty seat capacitance reducing electrode through the electric current sensing device and the drive device.

21. A capacitance-based sensor that is arranged in a seat of a vehicle and senses presence of an occupant in the seat, the capacitance-based sensor comprising:

an occupant sensing electrode that is embedded in the seat;
a capacitance reducing electrode that is disposed between the occupant sensing electrode and a frame of the seat, the frame and the occupant sensing electrode being connected to a vehicle ground;
an electric current sensing device that measures an electric current, the electric current sensing device being electrically connected in series between the occupant sensing electrode and the vehicle ground;
a drive device that generates a drive voltage, the drive device being electrically connected in series between the occupant sensing electrode and the vehicle ground; wherein
the capacitance reducing electrode is electrically connected at a point between the electric current sensing device and the drive device;
the electric current sensing device is electrically connected in one of a first location between the point of connection of the capacitance reducing electrode and the occupant sensing electrode and a second location between the point of connection of the capacitance reducing electrode and the vehicle ground;

the drive device is electrically in the other of the first and second locations; and the capacitance reducing electrode reduces a capacitance that is measured by the electrical current sensing device when the occupant is not present in the seat.

* * * * *

UNITED STATES PATENT AND TRADEMARK OFFICE
CERTIFICATE OF CORRECTION

PATENT NO. : 7,575,085 B2  Page 1 of 1
APPLICATION NO. : 11/337896
DATED : August 18, 2009
INVENTOR(S) : Kamizono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 696 days.

Signed and Sealed this

Seventh Day of September, 2010

David J. Kappos
*Director of the United States Patent and Trademark Office*